US012185044B2

(12) United States Patent
Aviv et al.

(10) Patent No.: US 12,185,044 B2
(45) Date of Patent: Dec. 31, 2024

(54) SAMPLER FOR AN INTELLIGENT CABLE OR CABLE ADAPTER

(71) Applicant: Prophet Productions, LLC, New York, NY (US)

(72) Inventors: Bobby Elijah Aviv, New York, NY (US); David G. Aviv, Las Vegas, NV (US); Mark Schaffel, Thompsons Station, TN (US); Guy Zohar, Nahsholim (IL)

(73) Assignee: Prophet Productions, LLC, New York, NY (US)

( * ) Notice: Subject to any disclaimer, the term of this patent is extended or adjusted under 35 U.S.C. 154(b) by 162 days.

(21) Appl. No.: 17/958,443

(22) Filed: Oct. 3, 2022

(65) Prior Publication Data

US 2023/0022204 A1 Jan. 26, 2023

Related U.S. Application Data

(63) Continuation-in-part of application No. 17/693,441, filed on Mar. 14, 2022, now Pat. No. 11,758,311, which is a continuation of application No. 17/354,893, filed on Jun. 22, 2021, now Pat. No. 11,290,797, which is a continuation of application No. 17/152,702, filed on Jan. 19, 2021, now Pat. No. 11,076,213, which is a continuation-in-part of application No. PCT/US2019/044257, filed on Jul. 31, 2019.

(60) Provisional application No. 63/355,188, filed on Jun. 24, 2022.

(51) Int. Cl.
*H04R 1/04* (2006.01)
*H04R 1/22* (2006.01)
*H04R 5/04* (2006.01)

(52) U.S. Cl.
CPC ................ *H04R 1/04* (2013.01); *H04R 1/22* (2013.01); *H04R 5/04* (2013.01)

(58) Field of Classification Search
None
See application file for complete search history.

(56) References Cited

U.S. PATENT DOCUMENTS 9,812,106 B1 * 11/2017 Miller ...................... G10H 1/02
10,575,084 B1 * 2/2020 Supper ................. H04R 1/1041
2007/0167689 A1 * 7/2007 Ramadas ................ A61B 5/16 600/595

* cited by examiner

*Primary Examiner* — Paul W Huber
(74) *Attorney, Agent, or Firm* — Amy L. Pearson

(57) ABSTRACT

A specialized audio/instrument cable with built-in digital signal processing capabilities that adds digital audio sampling capabilities that allows the user to trigger synthesized sounds or virtual musical instruments from within the cable itself to affect the sound generated from an instrument or microphone such that the cable is the only connection needed between the instrument or microphone and an output device. Using voice recognition, the specialized cable can select an audio effects chain algorithm and/or sampled sound algorithm extrapolated from a musical digital audio fingerprint (MDAF) created from a desired musician's instrument to alter the sound of the input instrument's audio.

20 Claims, 12 Drawing Sheets

SAMPLER FOR AN INTELLIGENT CABLE OR CABLE ADAPTER

BACKGROUND OF THE INVENTION

Before the personal computer was available to the masses and home recording took off, audio effects such as reverb, delay, chorus and other audio effects could usually only be added to an audio signal using professional equipment found in recording studios by manufacturers such as Solid State Logic, Neve, and Lexicon. Companies such as Eventide, Line 6, Hotone Audio, Ibanez, Roland, BOSS, DOD, and Korg, among numerous others, eventually developed these effects for mass production and housed the effects in either analog or digital pedals (stompboxes), or other effects units—most of which have been available in one form or another for at least 40 years.

FIG. 1 shows how musicians often use multiple pedals/stompboxes (one pedal/stompbox shown) 103 to add audio effects to the audio signal from an instrument 101 (or microphone) connected via an audio cable 102 such as a TS/TRS/instrument/speaker cable, an XLR cable, as well as other cables that can carry an audio signal. The processed audio signal is then sent to an output device such as an amplifier 106, PA system 105, or recording device via a second audio cable 104. Recent innovations allow a guitar pedal's 103 audio effect algorithms to be updated via a Bluetooth connection 107 between the pedal and an app (lication) on a smartphone 108. An example of this type of audio effects pedal is the Hotone XTOMP Bluetooth Modeling Effects Pedal. A smartphone app enables the musician to send audio effect algorithms to the pedal. Only the audio effect algorithms are sent to the pedal, not the parameters of the algorithms. Parameter changes are made via knobs on the pedal. Further, sending the audio effect algorithm to the pedal takes about 30 seconds. This pedal also requires an external power source.

The U.S. Pat. No. 9,812,106 records a piece of audio (such as a voice from a microphone or a guitar sound from a guitar) in a tablet, extracts parameters from the audio (such as frequency characteristics and phase analysis), and sends the audio parameters via an app to a wireless/Bluetooth pedal where an audio parameter can be used to modify an incoming audio signal. This method of sampling audio to create an audio effect appears to have no professional music recording utility (other than to create unusual sounds) over the current technology which includes thousands of digital reverb (algorithms), digital delay effects, distortion effects among numerous others, which are currently found in relatively inexpensive downloadable apps (such as ToneStack by Yonac Inc., AmpliTube by IK Multimedia, Bias AMP 2 by Positive Grid and Mobile POD by Line 6) or found in music software plugins (such as those manufactured by Waves Audio, Universal Audio, Native Instruments, IK Multimedia and others) used in a typical home or professional recording studio. These apps and plugins obviate the need, or even the desire, for musicians to spend time creating new audio effect algorithms based on sampling their own sounds. In addition, there are numerous companies who offer extremely high-quality audio effect algorithm plugins for free, such as Valhalla DSP, TAL Software and numerous others. Other companies, such as Ignite AMPS, make audio effect algorithms specifically for guitars and basses. With the '106 patent, the musician is required to perform the additional steps of recording and sampling a piece of audio to create audio effect parameters. This would also require more processing power from the DSP on the tablet as well as drain the tablet's battery life. Furthermore, the '106 patent requires the musician to purchase and carry an additional pedal and cable.

BRIEF SUMMARY OF THE INVENTION

As shown in FIG. 2, the iCable 201 is a specialized instrument or audio cable with built-in Digital Signal Processor (DSP) and wireless capabilities that enable a user to wirelessly receive audio data and apply it to an incoming audio signal within the cable itself. For a musician, the iCable enables a drastic simplification of equipment and enhanced portability. As shown in FIG. 6, Pedal Effects Mode 601 in the iCable app wirelessly transfers audio effect algorithms (such as reverb, delay, chorus, and/or distortion) and parameter settings (such as reverb mix, reverb size, and distortion level) to the iCable, saves the settings in audio effects presets (4 presets shown) such as Preset 1 610, and applies the audio effects to the audio signal coming into and passing through the iCable. Additionally, the musician can wirelessly import 607 presets into iCable app or export 608 presets from the iCable app to share with others. After presets are imported to the app, for example, from another musician, the presets can then be transferred to the iCable.

As shown in FIG. 2, the musician first downloads the iCable app onto her smartphone/tablet/computer 211. Next, the musician plugs in one end of the iCable 201 into her instrument 203 or a microphone 202 and the other end into an output device such as an amplifier 205, PA system 204, or recording device and powers on the iCable 201. When the iCable 201 is powered on, the iCable app can wirelessly connect to the iCable via a Wi-Fi or Bluetooth connection 209 by either initiating the connection from the app on the smartphone/tablet computer 211 or pressing a button on the iCable 201. After the connection to the iCable 201 is established, the musician can choose an audio effect or a combination of audio effects (audio effects chain) and adjust their individual parameters in the iCable app whilst playing her instrument 203 (or singing into her microphone 202). When the musician is satisfied with the sound of her instrument 203 after application of the audio effects, she can save the audio effects as presets in the iCable app on the smartphone/tablet/computer 211. When any parameter change is made within the iCable app, the change is automatically sent in real-time to the iCable 201. The change to the iCable 201 is initially a temporary setting to enable the musician to experiment with the adjustments to the audio effects. When the musician is satisfied with the adjustments, the musician can save the changes in the iCable 201. After the presets are stored in the iCable 201, the musician can then switch between audio effect presets from the app or by using an external controller such as an iPedal 206 or iClip 207 or a button on the iCable 201 itself.

Most musicians carry with them numerous audio effects units (such as stompboxes/pedals) along with corresponding audio cables (for every pedal, the musician needs two separate instrument cables as well as an independent power source) for live performance or recording. This can get very cumbersome and costly. Because the iCable 201 will have all of the audio effects capabilities built into it, all the musician will need to bring to a performance or recording is the iCable 201 and their smartphone 211. For further convenience, the musician may also use other optional "iCable enabled" controllers such as the iPedal 206 and/or the iClip 207 as discussed in detail below. In doing away with multiple stompboxes/pedals and corresponding audio cables, as well as housing the audio processing technology of the iCable within the cable itself, the iCable represents a new paradigm in live musical performance and recording: No extra cables, no extra pedals, no extra power sources. Significantly, the iCable also levels the playing field within the music-making ecosystem, by allowing musicians without a lot of disposable income to compete with those musicians who can afford to purchase numerous foot pedals/stompboxes and corresponding audio cables. For example, it is not uncommon for a typical guitarist or bassist to carry 5-10 pedals/stompboxes to performances in addition to all of the extra instrument cables needed to connect the pedals as well as corresponding batteries or power supply units. Instead of needing to buy additional audio effects pedals, the iCable app can allow the musician to simply download additional audio effects she chooses to use directly into her iCable 201.

Optional equipment of the iCable system includes an iClip 207, an iPedal 206, or as shown in FIG. 5, an iCable adaptor 501. In one embodiment, an iCable adapter 501 houses the invention instead of the cable. This allows musicians to easily turn their existing passive instrument or microphone cable into an iCable using a detachable iCable adapter 501 that houses all of the iCable circuitry. The iClip 207 and/or iPedal 206 wirelessly connect to the iCable 201 and allow the musician to wirelessly 208 switch between audio effect presets saved within the iCable 201. FIG. 4 shows that the iClip 401 is a small device placed, in the preferred embodiment, on the guitar headstock 402 that can be positioned proximate to or in precisely the same place of a digital guitar tuner (or can be placed on another area of a different stringed instrument) allowing the musician to operate the iClip in a familiar location while switching between the audio effect presets by tapping small buttons 403. The iClip 401 circuitry may also be incorporated into a digital tuner or have a digital tuner incorporated into it. As shown in FIG. 2, the iPedal 206 is a small foot pedal/switch allowing the musician a familiar location and process to switch between the audio effect presets by tapping on foot switches.

The iCable can also be used as either a looper/discreet multi-track recording unit as well as a background track playback device. As shown in FIG. 7, Looper Mode 701 in the iCable app allows multiple audio loops/overdubs (4 loops shown) to be recorded and played within the iCable while the musician's audio (e.g., guitar) signal is simultaneously processed within the iCable using audio effects. As shown in FIG. 8, Song Import Mode 801 in the iCable app wirelessly sends to the iCable pre-recorded songs or audio selections (4 songs shown) 802 to play alongside the audio signal processed by the iCable.

This invention may also be able to be used for other non-music related applications, such as different types of digital or analogue data that a cable might carry such as video data.

BRIEF DESCRIPTION OF THE DRAWINGS

Illustrated in the accompanying drawing(s) are embodiments of the present invention In such drawings.

The above-described drawing figure illustrates the described apparatus and its method of use in several preferred embodiments, which are further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

DETAILED DESCRIPTION OF THE INVENTION

Figure 6:
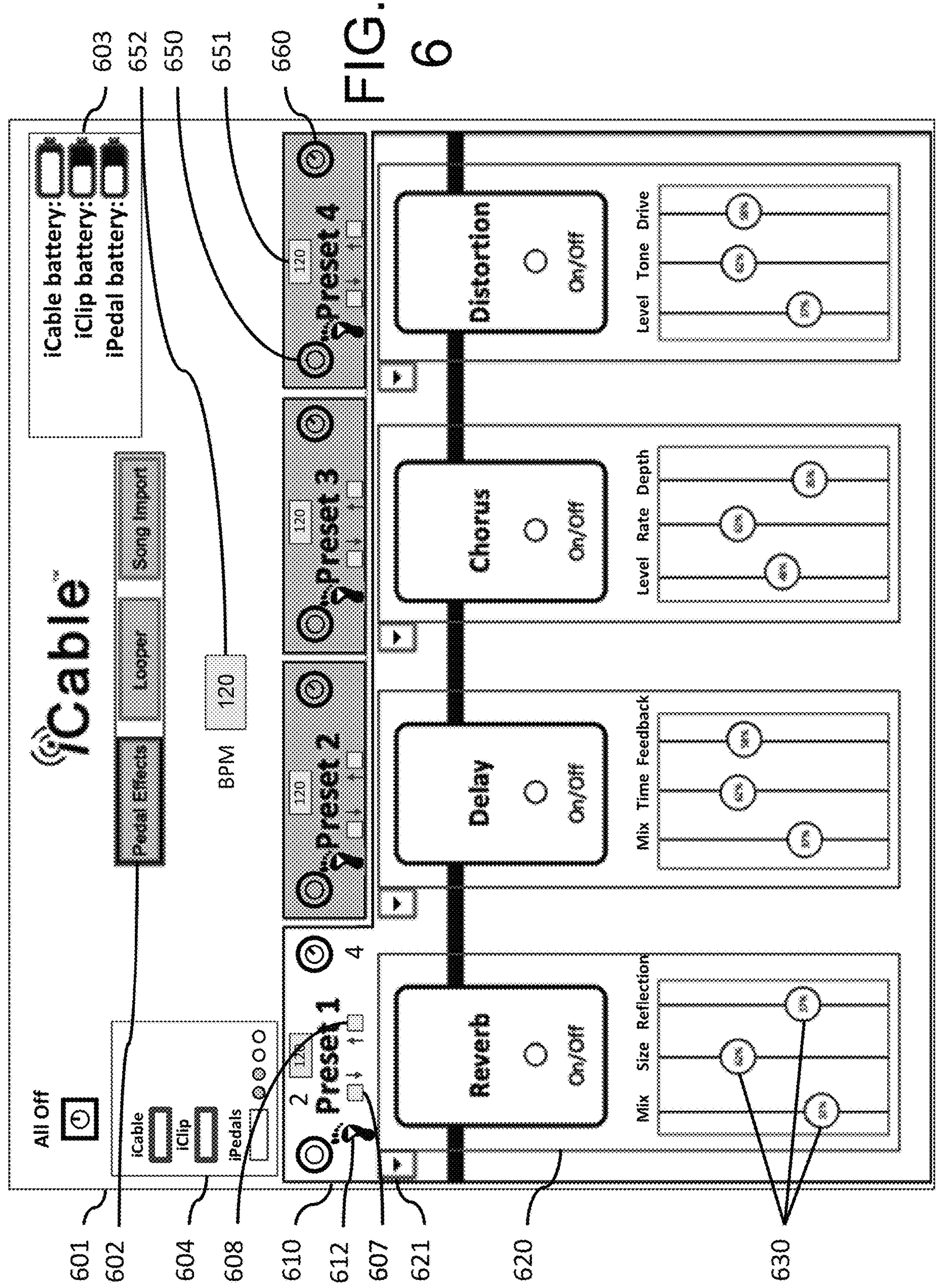
FIG. 6 shows an example of a graphical user interface for the iCable app in Pedal Effects Mode on a smartphone/tablet/computer.

The musician first downloads the iCable app onto her smartphone/tablet/computer. As shown in FIG. 6, the first interface in the iCable app is Pedal Effects Mode 601 which is selected by pressing the Pedal Effects button 602. Pedal Effects Mode 601 functions like any other smartphone audio effects app (such as IK Multimedia's AmpliTube) in that the iCable app allows the user to: (i) choose between numerous audio effects (such as reverb, delay, chorus, or distortion); (ii) choose the order of the effects; (iii) adjust effect parameters (such as reverb level and reverb tail length) for each of the audio effects; and (iv) download new audio effects into the iCable app. Unlike other smartphone audio effects apps, the iCable app also: (i) shows battery life of the iCable, iClip, and iPedal(s) 603; (ii) syncs with the iCable (discussed further below); (iii) shows iCable wireless connection status, iClip wireless connection status, and iPedal wireless connection status 604; (iv) optionally, connects to an external controller such as the iClip and iPedal; (v) imports/exports audio effect presets; and (vi) imports recorded audio directly from the iCable. Additionally, the iCable app can be configured to not just send to the iCable different types of audio (processing) effects algorithms, but video effects algorithms to process video information as well.

Figure 1:
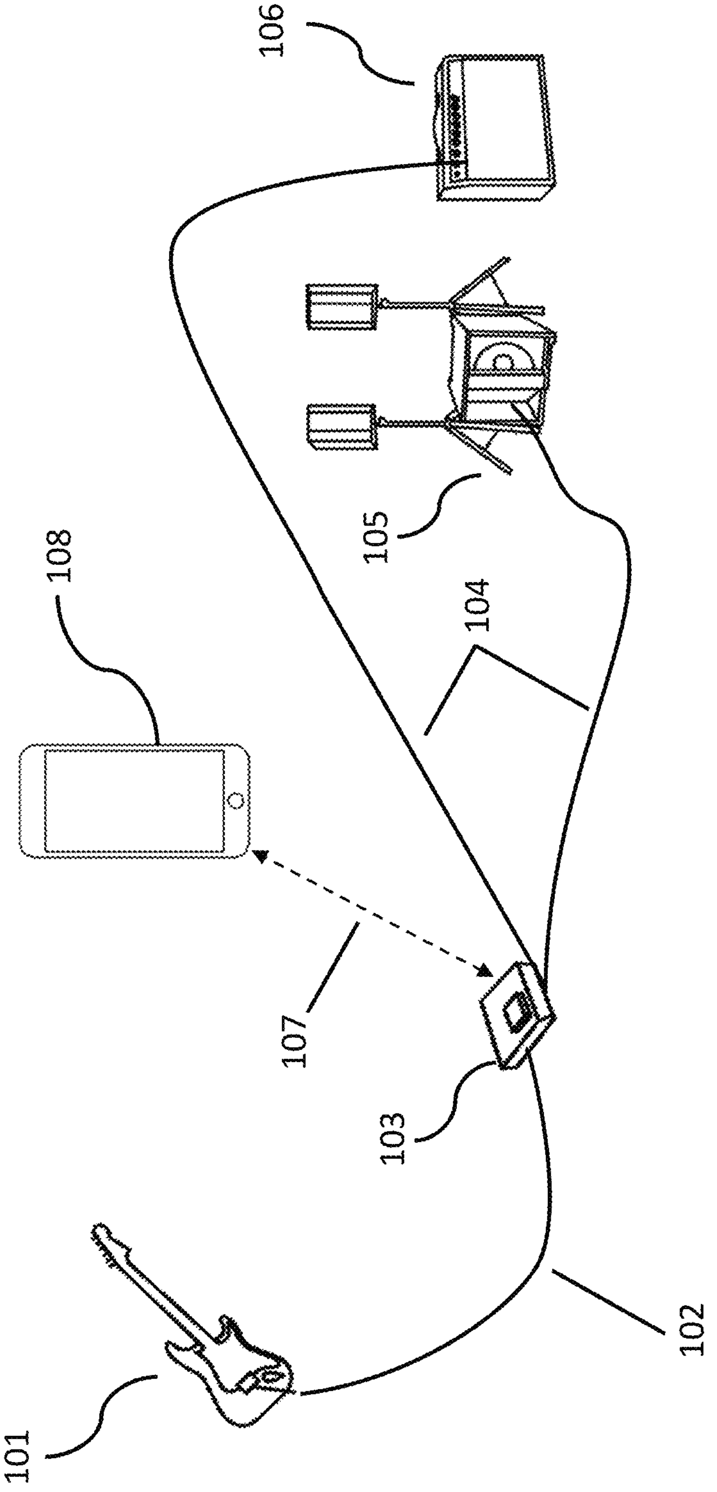
(PRIOR ART) FIG. 1
FIG. 1 is a diagram showing the prior art.
Figure 2:
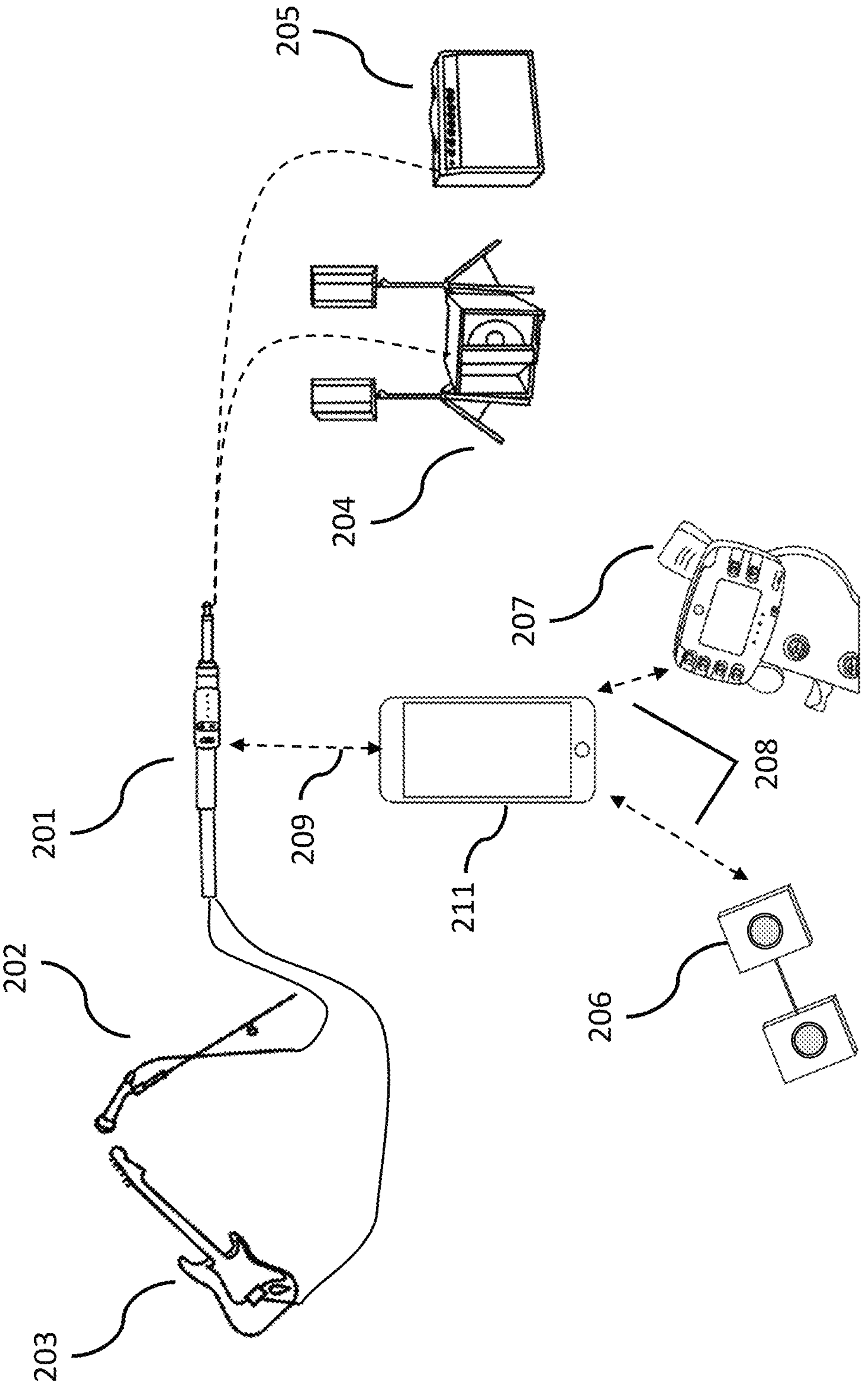
FIG. 2 is a diagram showing an overview of the iCable DSP Wireless System.

Next, as shown in FIG. 2, the musician plugs in one end of the iCable 201 into her instrument 203 and the other end into an output device such as an amplifier 205, PA system 204, or recording device and powers on the iCable 201 by pressing an On/Off switch on the iCable 201 such as the MINI micro slide switch.

The iCable 201 circuitry is housed within an audio cable such as the Mogami Overdrive Platinum Guitar Cable or a detachable audio cable adapter such as the Neutrik NP2x. The iCable 201 or iCable adapter contains: an input amplifier, an analog to digital converter, a Digital Signal Processor (DSP), memory, a rechargeable Li-ion battery, a battery charger controller, status LEDs, a USB-C input jack, an On/Off switch, an iCable microcontroller (MC), software that runs on the iCable microcontroller, a Wi-Fi/Bluetooth access point, a digital to analog converter, and an output amplifier.

When the iCable 201 is powered on, the iCable app on the smartphone/tablet/computer 211 wirelessly connects to the iCable 201 via a Wi-Fi or Bluetooth connection. The iCable may also have wireless capability built-in that allows the iCable 201 the ability to create its own local Wi-Fi network (independent of any local Wi-Fi signal). By using its own wireless local network, the user is able to wirelessly control audio effects (such as reverb, delay or distortion) on the iCable 201 by any iCable-enabled wireless controller connected to its local network. A local Wi-Fi access point (LWAP) is created in the iCable with a Wi-Fi/Bluetooth module such as the Murata Shielded Ultra Small Dual Band WiFi 11a/b/g/n+Bluetooth 5.0 Module. The iCable app connects to the LWAP using the standard Wi-Fi menu of available networks on the smartphone/tablet/computer 211. Alternatively, a wireless Bluetooth connection can be used as well. Although Wi-Fi is more stable over long distances, a reason to use Bluetooth over Wi-Fi is that the Bluetooth standard (called Bluetooth Low Energy) uses, as its name implies, low energy. This would extend the battery lifecycle of the iCable. The iCable app uses the wireless connection to wirelessly (i) send algorithms/parameters/commands to the iCable; (ii) receive battery status 603 and wireless connection status 604, 605, 606 from the iCable, iClip, and iPedal(s); (iii) send audio to the iCable in Song Mode (discussed below); (iv) receive recorded audio from the iCable in Looper Mode (discussed below); and (v) receives modified audio effect presets that have been modified from an external controller.

The iCable will also display the wireless connection status with the iCable app. A blinking blue light on the iCable indicates that the iCable is attempting a Wi-Fi or Bluetooth connection with the iCable app. A solid blue light indicates an established Wi-Fi or Bluetooth connection. Thus, the iCable app always shares the same wireless connection status of the iCable. While a wireless connection between the iCable and iCable app is preferred, this may also be a wired connection through a cable such as a USB-C cable.

Pedal Effects Mode

As shown in FIG. 6, in one embodiment, the iCable app has three modes that can be selected by the musician: Pedal Effects Mode 601; Looper Mode; and Song Import Mode. FIG. 6 shows an example of a graphical user interface for the iCable app in Pedal Effects Mode 601 on a smartphone/tablet/computer.

After the connection to the iCable is established, Pedal Effects Mode 601 enables the musician to choose audio effect algorithms (such as reverb, delay, chorus, and/or distortion) and adjust audio effects parameters in the iCable app whilst playing her instrument (such as reverb length, distortion level, and chorus depth). Parameter changes made within the iCable app are automatically sent in real-time to the iCable which enables the musician to experiment with her desired sound while making adjustments to the audio effects whilst playing her instrument.

In the preferred embodiment, there are four audio effect algorithm presets (could be more or less; four presets shown—Preset 1 610, Preset 2, Preset 3, and Preset 4). Each preset can have up to four audio effect algorithms (could be more or less; Reverb 620, Delay, Chorus, and Distortion shown). Each audio effect algorithm has an audio effect algorithm settings interface comprised of adjustable parameters 630. For example, the Preset 1 610 has four audio effect algorithms (Reverb 620, Delay, Chorus, and Distortion) each of which have their own adjustable parameters 630.

As shown in FIG. 6, the musician first selects a preset such as "Preset 1" 610. Then the musician selects up to four audio effect algorithms to use by clicking on the drop-down menus 621. The musician also selects an order in which the audio effect algorithms are applied by dragging the audio effect algorithms (such as Reverb 620) to the desired location within the preset 610. Audio effect algorithms are applied in order from right to left in Pedal Effects Mode 601 of the iCable app. As an example, the musician might choose to apply Delay before Reverb 620 instead of Reverb 620 before Delay as shown. Next the musician adjusts parameters 630 by sliding the parameter controls up and down. Preset 1 610 shows the following parameters: Reverb Mix=32%; Reverb Size=62%; Reverb Reflection=37%; Delay Mix=37%; Delay Time=62%, Delay Feedback=58%; Chorus Level=48%; Chorus Rate=62%; Chorus Depth=35%; Distortion Level=37%; Distortion Tone=62%; Distortion Drive=58%.

When any change is made to a preset within the iCable app (such as insertion of a new audio effect algorithm, a change to the audio effect algorithms application order, or a change to any of the audio effect algorithm parameters 630), the change is automatically sent in real-time to the iCable and the changed audio effect preset 610 in the iCable app visually indicates that a change was made by blinking the preset label ("Preset 1"), flashing in the preset tab, or displaying a blinking light. The change to the iCable is initially temporary to enable the musician to experiment with the adjustments to the audio effects. When the musician is satisfied with the adjustments, the musician can overwrite any stored settings for a particular preset by pressing the preset label ("Preset 1") for several seconds until the it stops blinking. This stops the visual indicator (indicating a change has been made) from flashing or blinking.

The musician can download or import another musician's audio effect presets to her iCable app by clicking on the Import Pedal Effects button 607 on a particular preset. To use the downloaded audio effect presets along with their corresponding settings, the recipient would need to have those same audio effect algorithms stored on their iCable/iCable app. In one embodiment, the audio effect presets comprise only the audio effect parameter settings. If a user does not have the audio effect algorithms related to the preset's audio effect parameter settings installed in her app, she will receive a pop-up window notifying her of this and, optionally, asking her to locate or purchase the needed audio effect algorithm(s). In another embodiment, the audio effect presets comprise the audio effect algorithms as well as the related audio effect parameter settings. The musician can also upload or share specific, customized presets of her audio effect algorithm preset settings by clicking on the Export Pedal Effects button 608 on a particular preset.

In one embodiment, the preset labels can be changed. For example, "Preset 1" could be changed to "Reverb+Dist." or "Hot Blues Solo".

Figure 3:
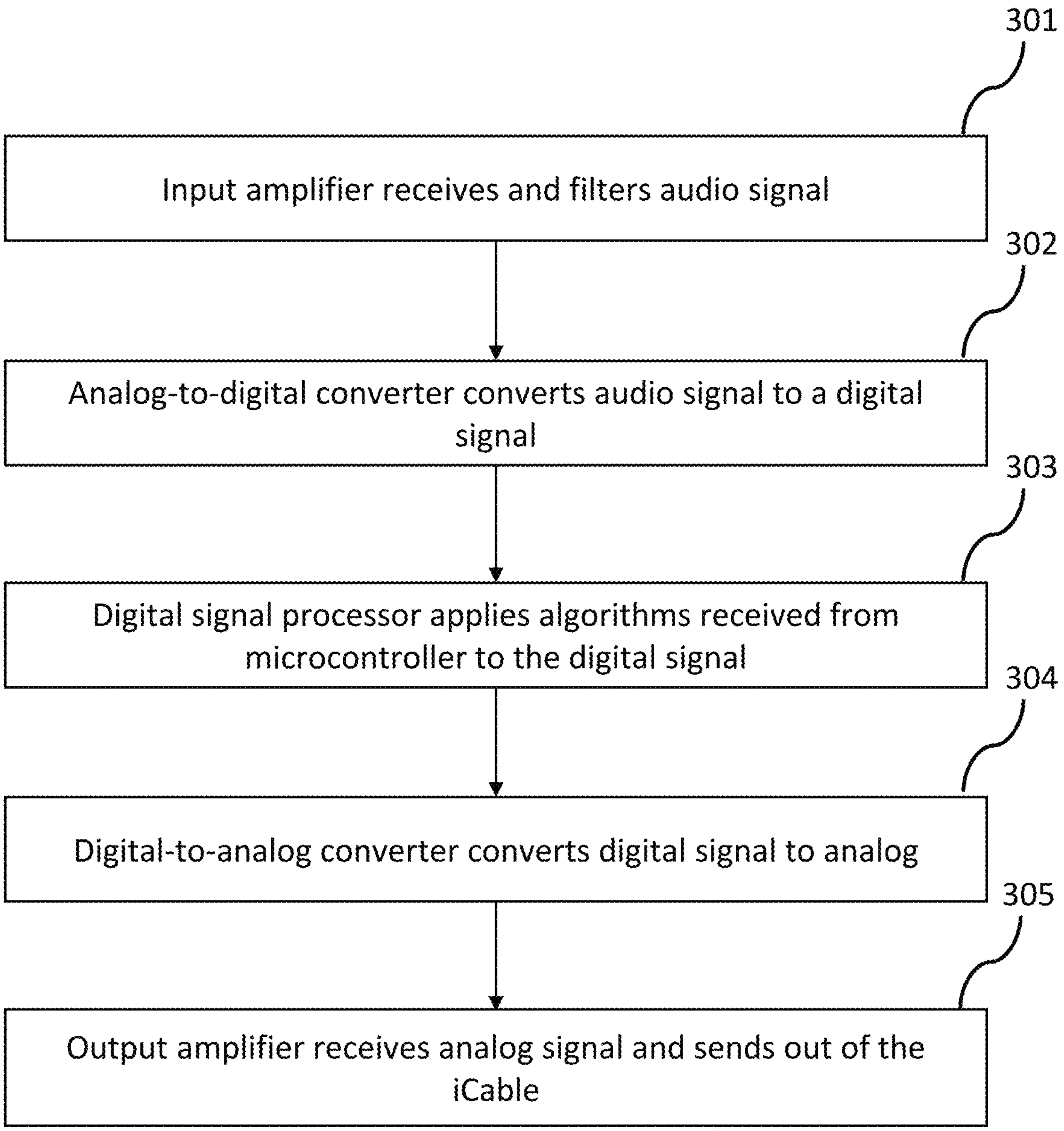
FIG. 3 is a process flow diagram showing how the iCable processes audio data.

FIG. 3 shows the process of one embodiment for the iCable processing audio data. In the iCable circuitry, housed within the iCable or iCable adapter, at step 301, the first component that receives the audio signal is the audio input amplifier such as the Texas Instruments TL072 which: (i) filters the input audio signal; (ii) adjusts the filtered audio signal to standardized or appropriate volume levels (known as line levels); and filters out any unnecessary frequencies.

At step 302, the adjusted audio signal is sent to the 12-bit analog-to-digital converter (ADC) such as the Texas Instruments PCM4201 having a sample rate of at least 128 Kbps (kilobits per second) (equivalent to CD-ROM audio quality) where it is converted to digital data. ADCs transform an analog voltage to a binary number (a series of 1's and 0's). The number of binary digits (bits) that represents the digital number determines the ADC resolution. However, the digital number is only an approximation of the true value of the analog voltage at a particular instant because the voltage can only be represented (digitally) in discrete steps. How closely the digital number approximates the analog value also depends on the ADC resolution. A 12-bit ADC has a resolution of one part in 4,096, where $2^{12}=4{,}096$. Thus, a 12-bit ADC with a maximum input of 10 VDC can resolve the measurement into 10 VDC/4096=0.00244 VDC=2.44 mV. More information about analog to digital conversion can be found in Measurement Computing's Data Acquisition Handbook. The ADC also has a sample rate which is how many times per second the audio signal is sampled. Thus, a greater sample rate will yield better audio quality.

After the analog audio signal is converted to digital, at step 303, the digital signal can be manipulated or processed by algorithms in the DSP. The specific DSP that is needed should ideally be a digital audio signal processor such as Analog Devices ADSP-21573 because it is specifically designed to process audio applications in the digital domain.

Algorithms and algorithm parameters are loaded on the DSP. For example, if the musician wants to add reverb to an audio signal, the parameters (i) "reverb level/amount" or (ii) "reverb tail length" (how long the actual reverb extends before it decays) would be sent as well as the reverb algorithm that uses the foregoing parameters. The iCable microcontroller such as the STMicroelectronics STM32F4 Series MCU delivers the parameters and algorithms to the DSP for executing the audio manipulation of the audio signal from the instrument. Alternatively, a more powerful iCable microcontroller could be used such as the STMicroelectronics STM32H7 which not only functions as a system microcontroller, but can also run the algorithms internally potentially obviating the need for a DSP.

The iCable microcontroller runs software that is responsible for handling all communication between the iCable and the iCable app. The iCable microcontroller is also responsible for (i) configuring the DSP in the iCable, (ii) running a "self-test" upon "power-up" to confirm that the iCable is operating normally, and (iii) monitoring the iCable, iClip, and iPedal battery and wireless status.

Upon power up, the software on the iCable microcontroller performs a built-in test/process to make sure that all of the hardware in the iCable is functional and connected properly. The iCable microcontroller software tests to make sure that the iCable microcontroller is communicating correctly with the DSP and that the interface is working correctly. The software also communicates with the WIFI/Bluetooth controller and performs a test to access the memory as well as check the internal Li-ion battery status.

The second step the software performs is the initialization of various components. The first item initialized is the DSP. The second item initialized is the Wi-Fi/Bluetooth controller. If no Wi-Fi access point had previously been created, the Wi-Fi/Bluetooth controller tries to create an access point, goes into standby mode, and waits for a smartphone/tablet/computer to connect to it to start receiving commands from the iCable app.

After the connection between the iCable and the iCable app is made, the iCable goes into operational mode where there is constant communication between the iCable microcontroller and the iCable app on a user's smartphone/tablet/computer. The iCable microcontroller sends the iCable wireless connection and battery status to the iCable app on the smartphone/tablet/computer, and the iCable app on the smartphone/tablet/computer in return sends algorithms, commands, and/or parameters back to the iCable. For example, the musician may want to put a new algorithm such as a special convolution reverb in the iCable. To do this, the musician uses the iCable app to select a specific reverb algorithm file on her computer (or elsewhere) and then loads/sends the algorithm file while the iCable connection is active. In the preferred embodiment the audio effect algorithms are only sent to the iCable one time and then stored until they are deleted or replaced. In the preferred embodiment, after an algorithm is stored on the iCable, only the algorithm parameters will need to be sent to adjust that algorithm.

The iCable microcontroller software can also be used to combine several audio effects together at once (e.g., reverb+distortion). These are the kinds of commands and parameters that are sent via the iCable app wirelessly to the iCable microcontroller. Each audio effect algorithm (reverb and distortion) will have its own parameters.

As with traditional effects pedals, the order in which the pedal effects on the iCable app are set up are important. Although it is very subjective and there are no rules, some musicians, for example, set the distortion pedal first, followed by modulation pedals (such as echo, chorus, flanger, tremolo, etc.) so that their distortion pedal receives the cleanest, purest signal from their guitar.

Every time a new command arrives from the iCable app to the iCable microcontroller, these commands are executed immediately by the iCable microcontroller sending updated parameters to the iCable DSP. The iCable microcontroller performs its computations in real-time, then communicates with the iCable DSP by changing the parameters of the audio effects such as the amount of reverb, the amount of delay, etc. In addition, the iCable DSP can access an additional memory component such as the Digi-Key 557-1904-1-ND to assist the DSP in (i) processing large amounts of digital data through the algorithms in real-time as the musician plays her instrument or sings; and (ii) storing numerous audio effect algorithms for real-time access.

After the algorithms are applied to the digital signal by the iCable DSP, at step 304, the digital signal is sent to the 12-bit Digital Audio Converter (DAC) such as the Texas Instruments TLV320DAC3120 where it is converted back to an analog signal. At step 305, the processed analog signal is sent to the audio output amplifier such as the Texas Instruments TL072 and out of the iCable, ready to be input into an output device such as an amplification system (i.e., a guitar or bass amplifier), powered speaker, PA system, music mixer, or a recording device.

When the musician is satisfied with the sound of her instrument after application of the audio effects, she can save the audio effects into one of four (as an example) presets in the iCable app which can later be selected in real-time while performing. In the preferred embodiment, the iCable holds at least four audio effect algorithms (such as Reverb, Delay, Distortion, and Chorus) which can be used in any combination and saved into at least four presets. As an example:

Audio Effect Preset #1
Reverb—Parameter 1, Parameter 2, etc.
Delay—Parameter 1, Parameter 2, etc.
Distortion—Parameter 1, Parameter 2, etc.
Chorus—Parameter 1, Parameter 2, etc.
Audio Effect Preset #2
Reverb—Parameter 1, Parameter 2, etc.

Delay—None

Distortion—Parameter 1, Parameter 2, etc.

Chorus—Parameter 1, Parameter 2, etc.

Audio Effect Preset #3

Reverb—Parameter 1, Parameter 2, etc.

Delay—None

Distortion—Parameter 1, Parameter 2, etc.

Chorus—None

Audio Effect Preset #4

Reverb—None

Delay—None

Distortion—Parameter 1, Parameter 2, etc.

Chorus—None

External Controller

Figure 9:
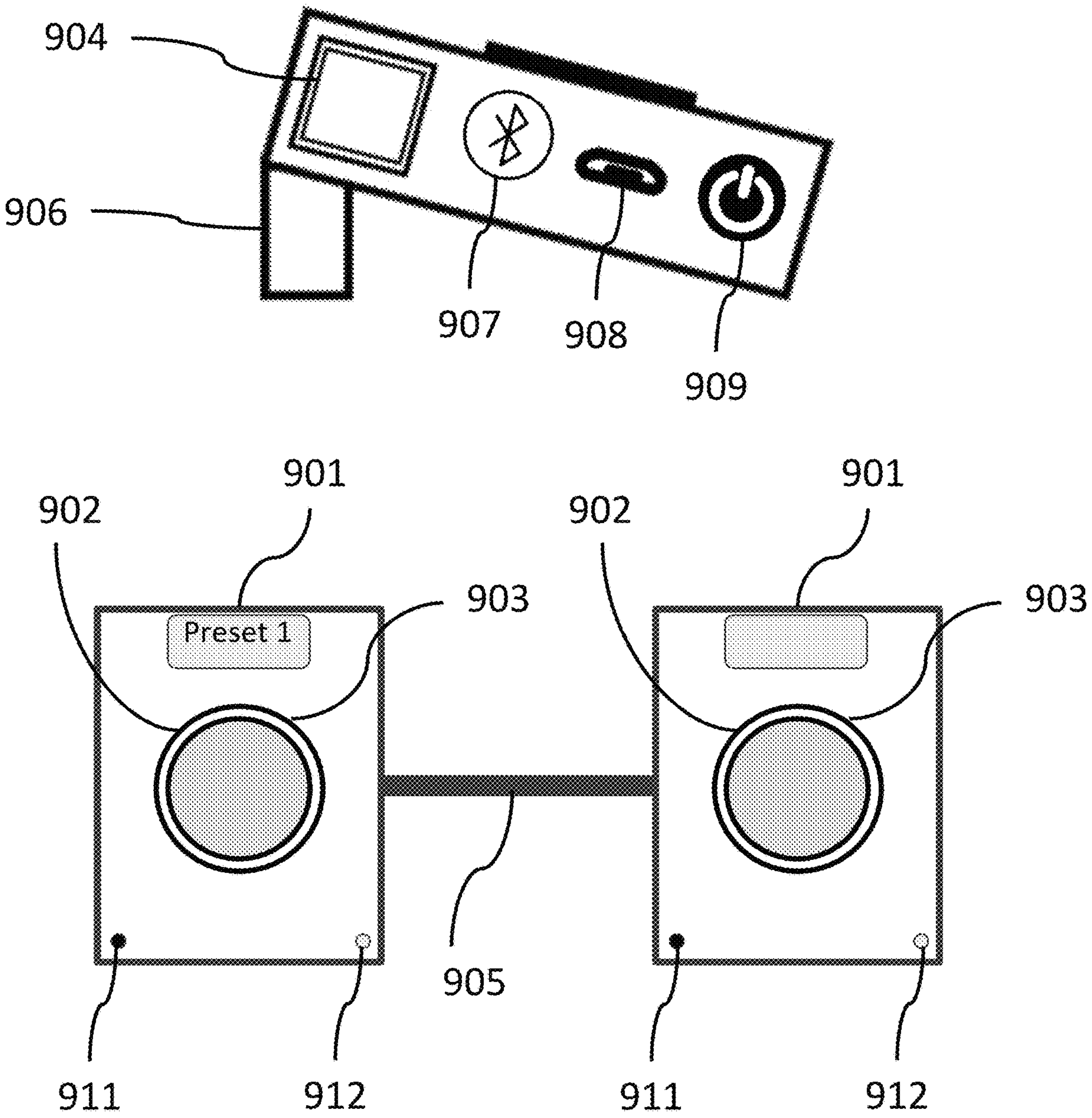
FIG. 9 shows the iPedal's top-down and side views.

Using the iCable app on the smartphone/tablet/computer to toggle between presets during a live performance might be awkward. Typically, the audience does not want to see a musician looking down at a screen. Eye contact with the audience is an important part of performing which would be lost if looking down at a smartphone/tablet/computer. Further, smartphones/tablets/computers have a tendency to automatically shut off the screen when not used for an extended period of time, then requiring the musician to enter a password to turn on the smartphone/tablet/computer again. Even though it is possible to disable automatic screen shut off, the musician does not need this worry during a performance. Further, leaving a screen on during a performance would be a large, unnecessary battery drain increasing the potential of the smart device running out of power during the performance. Utilizing the present invention, the musician can instead use an external controller such as (i) as shown in FIG. 4, the iClip 401, a small device placed on the guitar headstock 402—in the same place as a guitar tuner (as an example)—allowing the musician a very familiar location to switch between the audio effect presets by simply tapping/pressing one of four buttons 403 representing the 4 presets stored in the iCable; or (ii) as shown in FIG. 9, the iPedal 901, a small foot pedal/switch allowing the musician a familiar location to wirelessly switch between the audio effect presets by tapping foot switches 902.

For decades, musicians have used guitar tuners clipped to the headstock of their electric and acoustic guitars, bass guitars, or other musical instruments to tune their instruments. The proximity of the digital tuner to the guitar tuning pegs (the little knobs one turns to tune the guitar string) is very important. The digital tuner is positioned so that the musician does not have to take her eyes off of either the tuner or the tuning pegs for too long. As shown in FIG. 4, in the preferred embodiment, iClip and digital tuner circuitry/hardware are incorporated into the same device in that same location as a digital tuner. Alternatively, the iClip 401 can be placed in a position that is familiar to a musician for her particular instrument. The iClip 401 has a Tuner On/Off button 404 that allows the musician to use the iClip 401 as a tuner.

Figure 4:
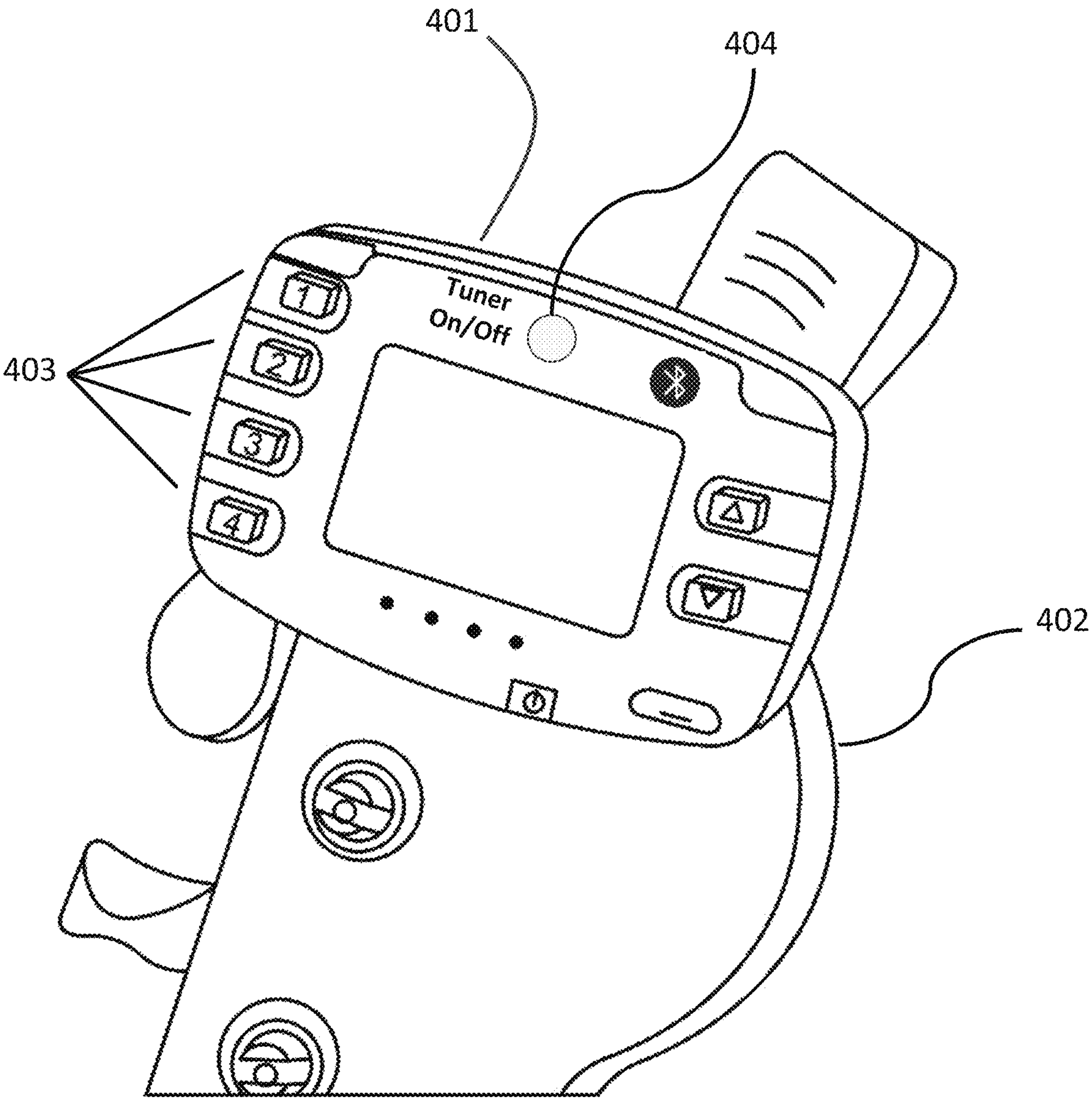
FIG. 4 shows an iClip on a guitar headstock.
Figure 5:
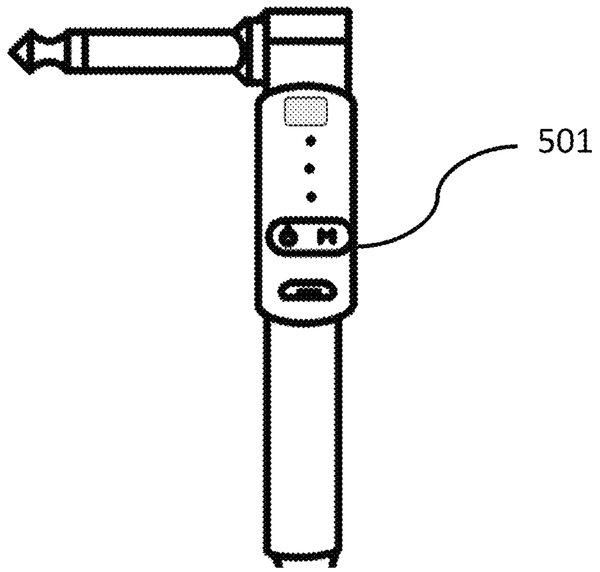
FIG. 5 shows an iCable adapter.

As shown in FIG. 4, a main function of the iClip 401 is to change or toggle through the different preset audio effects previously stored in the iCable using the toggle buttons 403. The musician won't need to use the smartphone/tablet anymore once the parameter-adjusted audio effects are loaded into the iCable DSP because the user can then toggle between the loaded audio effects presets with the iClip 401 or iPedal. The app on the smartphone/tablet/computer won't be needed again until the next time the musician wants to either download new audio effects onto the iCable or to change a parameter of an audio effect in the iCable. For that to take place, the musician would need to use the iCable app within the smartphone/tablet/computer.

In the preferred embodiment, the iClip 401 operates as a wireless controller for the iCable, only allowing the musician to toggle between presets. In an alternate embodiment, the iClip 401 can also adjust audio effect parameters similar to the iCable app. Various mechanisms can be used to make the adjustments such as: (i) physical slider mechanisms, knobs, or buttons; or (ii) the iCable app embedded in the iClip 401, but with a much smaller form factor so that the iClip 401 can fit on the guitar headstock. When audio effect parameter adjustments are made using the iClip 401, the changes can be displayed in real-time on both a small screen 409 on the iClip 401 as well as in the iCable app on a tablet, computer, or other large screen such that the musician can see the adjustments made in real-time without looking down at the iClip 401 while playing the guitar. The musician could walk up to a larger screen during a live performance and make parameter adjustments with the iClip 401 and see those parameter adjustments appear in real-time on a larger screen.

When any change is made from the iClip 401 to a preset (likely during a sound check, performance, or rehearsal when the musician does not have access to the iCable app), the change is automatically sent in real-time to the iCable and the preset number 403 on the iClip 401 flashes red to visually indicate that a change was made. The change to the iCable is initially temporary to enable the musician to experiment with the adjustments to the audio effects. When the musician is satisfied with the adjustments, the musician can overwrite any stored settings for a particular preset in the iCable by pressing the corresponding iCable preset number 403 on the iClip 401 and holding it for a few seconds until it stops flashing.

When the musician returns to the iCable app in the smartphone/tablet/computer (after the performance), the iCable app will compare the date stamps of the parameter changes on the iCable to the parameters in the iCable app. If the date stamp is later on the iCable then that on the iCable app, a window will pop up notifying the musician that there has been a change to a preset in the iCable and prompting the musician to overwrite the preset in the iCable app so that there is parity between the iCable and the iCable app. The iCable will always store the latest audio effects parameter changes.

In an alternate embodiment, the iClip 401 may also store the adjusted audio effects. This would require the iClip 401 to have an internal DSP.

The iClip 401 can operate either as part of a local WiFi network, such as the WiFi network created by the iCable, or as part of a Bluetooth connection or other wireless protocol. An advantage of using WiFi for the iClip is that the iCable is able to act as a WiFi access point and numerous devices such as the iClip and iPedal can connect to it. Also, WiFi has a larger range than Bluetooth. A disadvantage of using WiFi for the iClip, however, is that if the smartphone is connected to a WiFi Network, the smartphone will not be able to access another WiFi network using standard software. Also, because WiFi uses more power, it will drain the iClip battery faster. Using Bluetooth for the iClip would use less power and keep the WiFi connection open for other uses on the smartphone. Bluetooth is also very stable and easy to configure.

With Bluetooth, however, signal dropouts often occur if there is movement of one or more of the Bluetooth devices or if there is no line-of-sight between the two devices.

The actual Bluetooth connection between the iClip and the iCable is made by clicking a button on the iCable which will send a signal that the iClip will find (both on its screen and via a blinking LED) after which the user can simply click on the appropriate button to accept the iCable's Bluetooth signal. In another embodiment, the iCable app would be able to connect the iCable with both the iClip and iPedal(s). In another embodiment, as shown in FIG. 4, the iClip will have a Bluetooth connect button 406 which will allow it to connect to the iCable and iCable app as well. The iCable app always shows wireless connectivity. The preferred embodiment has 3 masters (iClip, iPedal, and the iCable app) with the iCable as a slave.

Once the connection between the iClip 401 and the iCable is made, the iClip screen, the iCable app screen 601, and the LED on the iCable will show that the connection is active. With an active connection, the iClip 401 allows the user to toggle between audio effects presets stored in the iCable by simply pressing the small toggle buttons 403.

In the preferred embodiment, the musician would use both the iClip and the iPedal. Depending on the style of music being played, the musician may decide to only use or need the iClip to change to a different preset within a song. However, if the musician is required to play both rhythm and lead sections of a song, then that player would benefit from having the convenience of both the iClip and iPedal to make it easier for her to choose rapidly—in real-time, between where her hand could reach or where her foot could reach easily to make a preset change. For most musicians, however, the iClip should be sufficient to change presets within a song during a performance or recording.

As shown in FIG. 9, the iPedal 901 has a pedal button 902 on top with a halo light 903 and a connector port 904 on each side. The iPedal connector arm 905 expands from 1-3 inches. The connector arms can expand much like the Sandao Retractable Teacher's Telescopic Pointer. The aluminum casing of the connector arm 905 could also be flexible to allow the musician to connect several iPedals in a semi-circle for easy access. Each iPedal would be sold with a single connecter arm 905 which would snap into the connector port 904 on either side of an iPedal 901. A retractable built-in stand 906 enables the iPedal 901 to tilt to make it easier for the musician to press while standing and playing her instrument. In one embodiment, the angle of the built-in stand 906 is adjustable. In another embodiment, the iPedal 901 is built at an angle.

The iPedal 901 has a Bluetooth connect button 907 which allows it to connect to the iCable and iCable app. Once the connection between the iPedal 901 and the iCable is made, the Bluetooth activation light 911 on the iPedal 901 will be solid blue to show the connection is active. The iPedal's battery is charged through the charger port 908 which can also be used to power the iPedal 901. The iPedal 901 is powered on by pressing On/Off button 909. The battery status light 912 indicates when the battery is charged (solid green), low (yellow), not charged (red), or charging (flashing red, yellow or green).

The iCable app recognizes each new iPedal as they wirelessly (Bluetooth or LWAN) connect to the iCable. Pedal effect presets/loops/songs can be assigned to the iPedals in the iCable app. In the preferred embodiment, the iPedals are modular—that is, each iPedal can be configured to work with a specific audio effect preset within the iCable. In an alternate embodiment, numerous commands can be given to a single iPedal such as "Click twice for Preset 2" or "Click three times for Preset 3".

To assign a specific preset to a particular iPedal, the musician clicks on the arrow associated with the foot icon 612 in the preset that the musician wants to assign. The musician selects the iPedal to be associated with that preset. For example, she can assign Preset 1 610 to a first iPedal and Preset 2 to a second iPedal and so on. In one embodiment, the user can also assign an iPedal to be used as a looper pedal or a song playback pedal (as discussed in detail below).

In the preferred embodiment, audio effects applied by the iPedal take precedence over audio effects applied elsewhere—by the iCable, iClip, or the iCable app. When a musician clicks on an iPedal, the audio effect preset assigned to that particular iPedal will activate, turning off any previously applied audio effects. When the musician clicks again on that iPedal, the preset for the iPedal will stop and the iCable will revert to the previously applied audio effects. For example, the musician first assigns Preset 2 to the iPedal in the iCable app. Then, if Preset 1 was previously selected by the iClip and the musician now presses the iPedal button 901, then Preset 2 will be applied instead of Preset 1. Then, if the iPedal button 901 is pressed again, the iCable reverts to applying the audio effects in Preset 1.

The iCable will always hold the latest audio effects presets. Upon connection to the iCable, the iCable app will compare the date stamp of any modified audio effects in the iCable to the date stamp of any audio effects that are currently stored in the iCable app. If the date stamp of an audio effect in the iCable is of a later date than the date stamp of the audio effect in the iCable app, the iCable app prompts the user to determine if she wants to overwrite the audio effect parameter settings in the iCable app for that particular audio effect preset stored in the iCable.

The remaining components in the iCable are the rechargeable Li-ion battery or other type of battery, with corresponding battery charger controller, status LEDs, and a USB-C connector.

A rechargeable Li-ion battery such as the LiPo Battery 300 mAh+ with corresponding battery charger controller such as the Analog Devices LTC4053-4.2 is used so that the iCable can be self-powered without needing an external power source.

One or more Status LEDs such as the Kingbright APFA3010SURKCGKSYKC are also included on the iCable to show the status of the iCable in situations such as: (i) a blinking green (or other color light) when the iCable is charging; (ii) a solid green light when fully charged; (iii) a yellow light when the iCable does not have much battery power left; (iv) a red light if there is an error within the iCable; (v) a blinking blue light when attempting a Wi-Fi or Bluetooth connection; and (iv) a solid blue light when a Wi-Fi, Bluetooth, or other wireless connection is made. The Status LEDs may be one RGB LED having three or more LEDs in one package or can be three separate LEDs (as an example). Software for the Status LEDs stored on the iCable microcontroller determines the color and activity (blinking, duration of blinking/flashing, etc.) of each Status LED.

A USB-C Connector such as the Amphenol 523-124019282112A is used in the iCable to: (i) charge the iCable internal, rechargeable Li-ion battery at the battery charger controller when the USB-C connector is plugged into its own source of power; (ii) connect the iCable microcontroller for firmware updates to configure the iCable; (iii) connect the iCable microcontroller to load additional algorithms onto the iCable microcontroller memory giving the user the ability to share, receive or purchase third-party algorithms and load those algorithms onto the iCable; and (iv) during manufacturing of the iCable, give the engineers the opportunity to do system testing within the iCable as well as testing and/or diagnosing the iCable for proper status and/or condition.

In the event that the iCable stops working, runs out of batteries, or, importantly, if the musician does not want to use the audio effects on the iCable, the iCable may be used passively as a standard instrument or microphone cable just like how all typical instrument cables are currently used. This allows the musician complete flexibility in using the iCable as either a passive or active instrument cable with no attenuation to their audio signal.

In an alternative embodiment, the present invention may also be used with analog sound effects. Analog sound effects are created by using a combination of transistors, diodes, op amps, integrated circuits, resistors, capacitors, potentiometers, and a power source. Multiple sound effects can be combined in one device and the parameters of that device can be adjusted manually or digitally (similar to the Chase Bliss Brothers Guitar Pedal) with knobs or sliders, or preferably, in the iCable app. In this embodiment, the analog effects components and the above disclosed iCable components could be housed together and located such that the weight of the device would not interfere with instrument play. This analog embodiment may be larger than the digital version, but still would be able to be incorporated in a cable. In this embodiment, digital controls would regulate the variable analog components and output an analog signal.

Looper Mode

Figure 7:
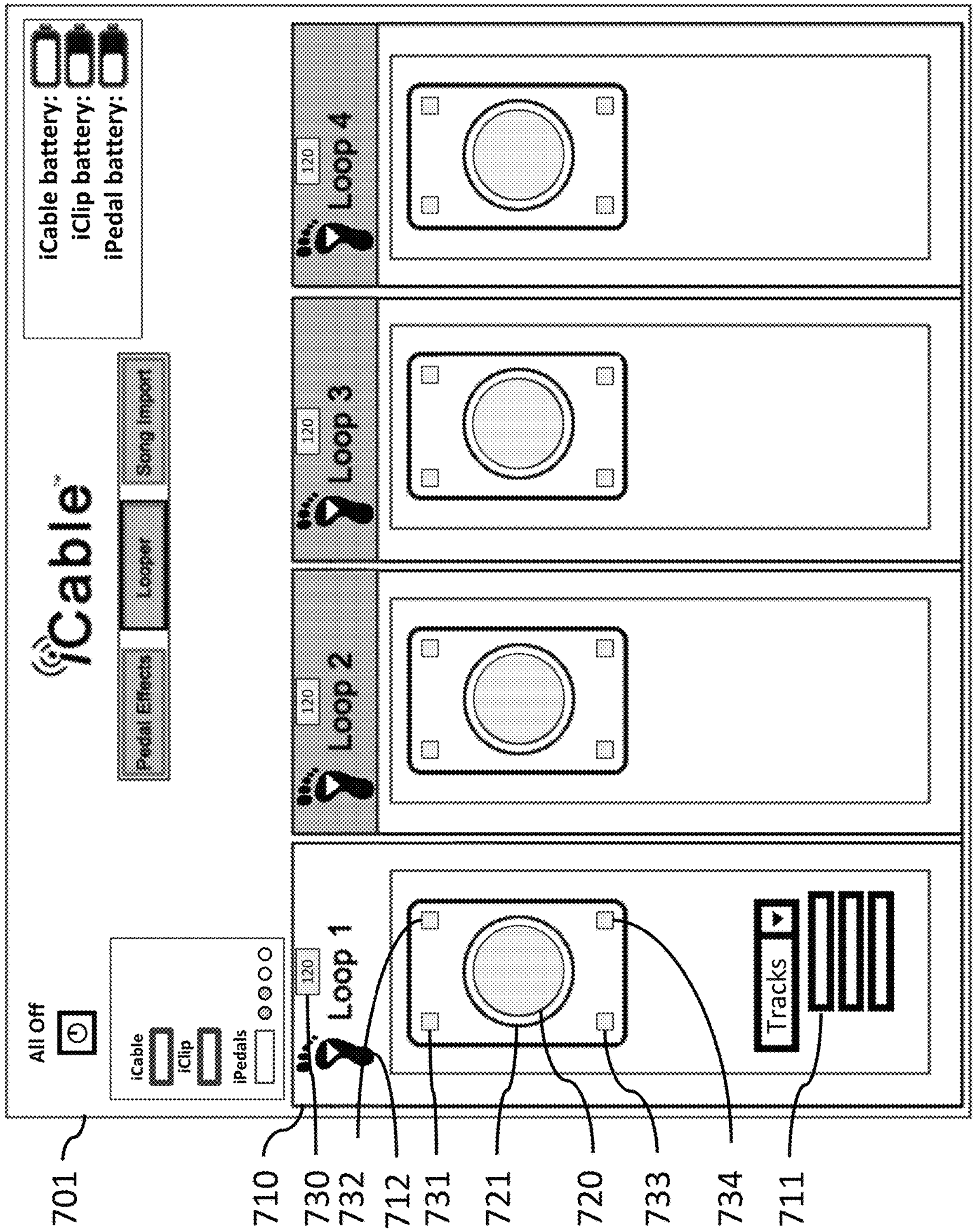
FIG. 7 shows an example of a graphical user interface for the iCable app in Looper Mode on a smartphone/tablet/computer.

The iCable can also be used as a discreet Looper with individualized tracks (much like how a multi-track recording unit records parts on separate tracks). As shown in FIG. 7, in Looper Mode 701, the musician records Loop 1 710. As a musician records/overdubs more recordings with each pass of the loop, each recording is saved on a separate track 711 of audio under the heading of that specific loop, Loop 1 710. All loops/tracks of audio (such as those in Loop 1 710) are played alongside the audio signal passed through and processed by the iCable. For example, in Loop 1 710, there could be eight tracks 711 of audio that were created/recorded by eight different passes of that first looped audio recording.

The interface for each loop such as Loop 1 710 and its corresponding tracks 711 has, at the center, a loop button 720 surrounded by a concentric circle called a halo 721. The color of the halo 721 provides a current visual status of the loop. A white halo 721 indicates that the loop is empty or available to fill. A solid red halo 721 indicates that the loop is currently recording. A green halo 721 indicates that the loop 710 is not empty. The same haloing feature is also displayed on the iClip and on the iPedal. While playing back a loop, the halo 721 light around the corresponding loop button 720 on the iClip, iPedal, and the iCable app will incrementally light clockwise in dark green with a solid light green backdrop to indicate the current position in the loop's duration. For example, if the loop is playing and the halo light 721 is completely light green, it is the start of the loop. Likewise, if the loop is halfway through the loop's length, the halo light 721 will be half lit in dark green with the dark green section of the halo light 721 starting at the 12 o'clock position and stopping at the 6 o'clock position.

To record a loop such as Loop 1 710 in Looper Mode 701, the musician first either: (i) sets the tempo with the tempo slider that pops up when holding down the loop's BPM button 730; or (ii) taps the tempo with the BPM button 730. If the BPM button 730 is pressed more than one time, it is taken as a tempo which adjusts to the speed of the tapping. The tempo speed (e.g., 120 beats per minute) is visually displayed in the BPM button 730 and in the iClip (in the preferred embodiment) by a flashing red halo light 721 in time to the tempo.

In one embodiment, the recorded loop/tracks are recorded directly into the iCable after which the audio will be sent back to the iCable app. In one embodiment, the iCable syncs its created loops/tracks of audio automatically with the iCable app. In another embodiment, the iCable will compare the date stamps of the loops/tracks in the iCable to the loops/tracks in the iCable app. If the date stamp for a loop is later in the iCable then that on the iCable app (more current), a window will pop up notifying the musician that there has been a change to a specific loop in the iCable and ask the musician to overwrite the loop in the iCable app. The iCable will always store the latest loops/tracks.

To assign an iPedal to be used as a looper pedal, the musician clicks on the arrow associated with the foot icon 712 in the loop that the musician wants to assign.

To start recording, the musician presses the loop button on the iClip, iCable app, or iPedal. As an example, if the musician wants to record Loop 1 710, the musician taps on the loop button 720 of Loop 1 710. The halo light 721 then becomes a solid red to indicate that the iCable is recording. In the preferred embodiment, recording stops when the musician taps the loop button on the iPedal but can also be stopped by pressing the loop button 720 in the iCable app or on the iClip.

When recording stops, the loop/track automatically continues to loop. The current position of the loop playback is displayed in green on the halo 721. To pause the loop, the musician taps twice in succession on loop button 720. From the pause position, if the musician wants to continue playback of the loop, she would click on the loop button 720 once again. While in playback mode if the musician presses the loop button 720 once, the iCable will record a new track within that specific loop. In essence, the looper toggles back and forth between record and playback modes unless double-tapped for pause, after which tapping once again enables playback mode then record mode and so on.

In one embodiment, when the musician is recording in Looper Mode, she is able to continue playing back the loop while switching to Pedal Effects Mode using the app (or mode button 405 on the iClip or another controller device) to choose a different preferred audio effect preset after which she then is able to switch back to Looper Mode to continue to overdub new tracks in her loop if she chooses.

The halo 721 can also be used to fast forward or rewind by touching the halo 721 and sliding one's finger on it to move to the desired position in the song. This clicking routine for recording, playback and pausing, can be used on the iClip and iPedal as well by clicking on their corresponding loop buttons.

The order of the loops can be changed in the iCable app by dragging and dropping a loop such as Loop 1 710 in the iCable app to its desired position.

To delete the contents of any loop, the musician presses the delete button 733 on the app and is prompted to choose whether or not to delete the selected loop and all of its corresponding tracks. A loop and its corresponding tracks can also be deleted by holding down on the loop button 720 for several seconds after which the halo 721 will blink red and then turn white indicating that the loop was deleted. In another embodiment, this clicking routine for deleting can be used on the iClip and iPedal as well by clicking on their corresponding loop buttons (similar to loop button 720) and holding for several seconds.

Once loop recording is finished, each loop with its corresponding tracks can be imported (as an mp3 file or something similar) from the iCable to the iCable app by clicking on the Import Loop Audio from iCable button 731. Once imported into the iCable app, each loop (and its corresponding tracks) can be exported (as an mp3 file or other type of audio file) from the iCable app by clicking on the Export Loop Audio from iCable button 732 after which a pop up will ask the user where she would like to send the recorded audio.

The loop labels such as "Loop 1" can be changed to help the musician easily identify on the loop which becomes important after the creation of a new loop to title the piece of music.

The tracks recorded/overdubbed within a specific loop can be viewed on the iCable app from a dropdown menu 711, where the user can also label the individual tracks prior to exporting them with the Export Loop Audio from iCable button 732. For example, the tracks may be labeled rhythm guitar 1, rhythm guitar 2, lead guitar, etc.

A click track can be generated by the iCable based upon the BPM whose tempo can be controlled by the iCable app, iClip, or iPedal. Click track parameters can include tempo, sound of the click (such as a bass drum or stick hit), and On/Off 734.

Song Import Mode

Figure 8:
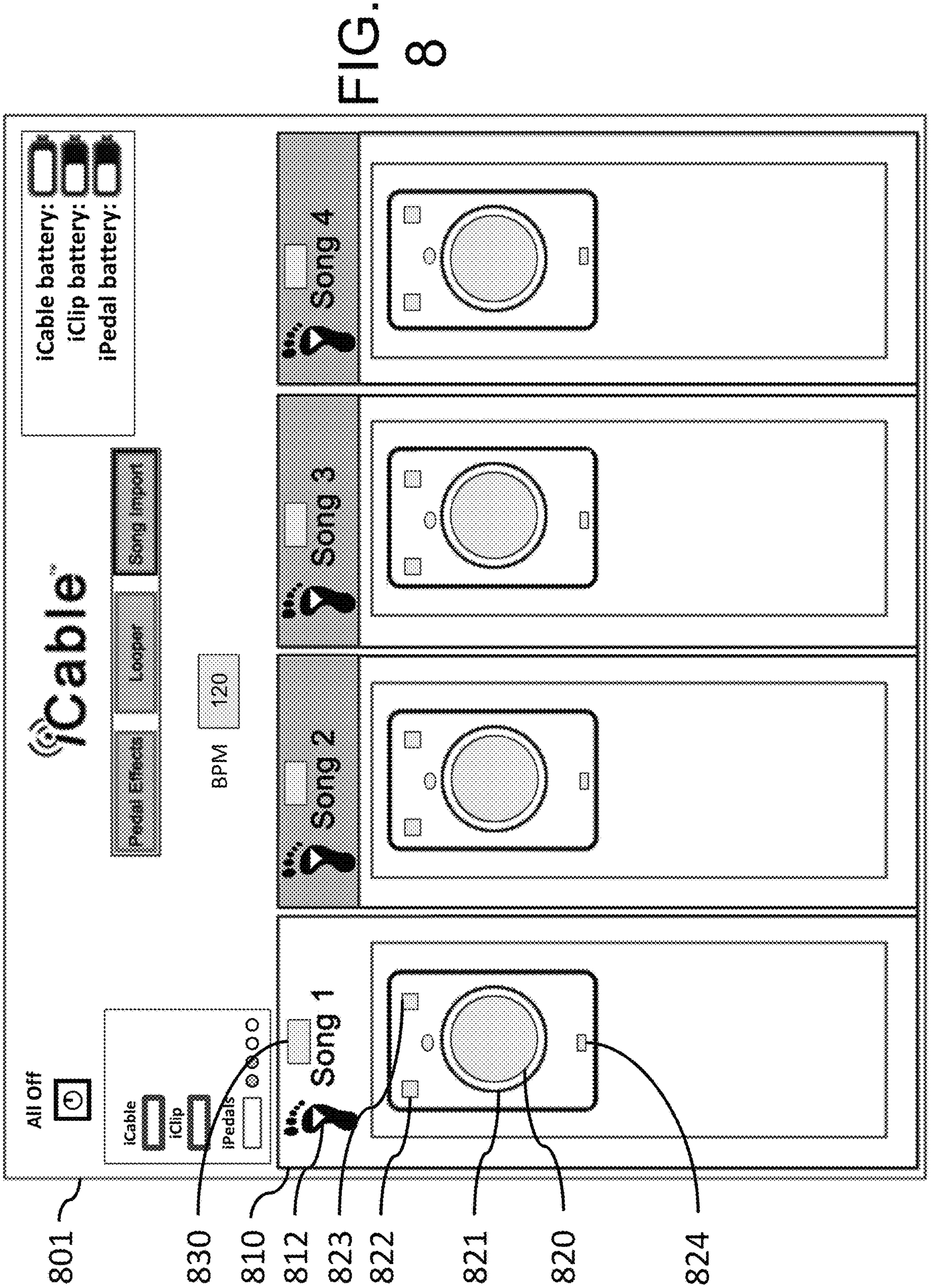
FIG. 8 shows an example of a graphical user interface for the iCable app in Song Import Mode on a smartphone/tablet/computer.

As shown in FIG. 8, Song Import Mode 801 enables a musician to play/sing along with one or more stored background tracks. In Song Import Mode 801, the iCable wirelessly receives background tracks (4 tracks shown—Song 1 810, Song 2, Song 3, and Song 4) which are played alongside the audio signal passed through and processed by the iCable.

The interface Song Import mode has, at the center, a song On/Off button 820 surrounded by a concentric circle called a halo 821 that visually displays playback position of the track and operates in the same manner as the Looper Mode halo.

Using the playback options 830, the musician can: (i) play a single song once; (ii) loop a single song; (iii) play all the songs once; or (iv) loop all the songs as a song list.

To begin playback of a song or songs, the musician clicks the song button 820 from either the iClip, iPedal, or the iCable app. If the song button 820 is clicked again, the song is paused. If the song button 820 is clicked twice fast, the song (or song list) will start replaying at the beginning. The halo 821 is used to fast forward or rewind by touching the halo 821 and sliding one's finger on it to move to the desired position in the song.

To import a song to the iCable, the musician must first import the song to the iCable app by clicking on the Song Import to App button 822 on a particular song. The musician is then prompted to locate and select the audio file to import. Upon importing the desired music into the iCable app, the song's title is automatically updated in the app, after which the app then prompts the user to send the song to the iCable. If the musician chooses to send the song to the iCable, the halo 821 turns from white to green to show a song is now stored in the iCable. If the musician chooses not to send the song at that time to the iCable, the musician can later send it to the iCable by pressing the Export to iCable button 823. The musician can delete a song by pressing the delete button 824 or holding down the song button 820 for several seconds.

The order of the songs can be changed in the iCable app by dragging and dropping a song such as Song 1 810 in the iCable app to its desired position.

To assign a specific song such as Song 1 810 to a specific iPedal or iClip button, the musician clicks on the arrow associated with the foot icon 812 in the song that the musician wants to assign. The musician selects hardware (iPedals, iClip buttons, iCable buttons) to be associated with that song. For example, she can assign Song 1 810 to a first iPedal and Song 2 to a second iPedal and so on.

The labels for the songs in Song Import mode can be changed to help the musician easily identify the imported songs.

Tempo-Adjusted Effects

In one embodiment, the iCable DSP analyzes an incoming audio signal to determine the current tempo/beats per minute (BPM) of the audio passing through the iCable. In another embodiment, the iCable has a microphone that analyzes outside music (music external to the iCable) to determine BPM. Once the BPM is determined, an iCable DSP can globally (or individually) automatically adjust BPM-based effects in the iCable to adjust to the analyzed tempo. Audio effect algorithms that can be based on the tempo or beat analysis of the audio signal may include delay, tremolo, vibrato, reverb among others. As shown in FIG. 6, the automatic beat sensor system button 650 located in each preset is clicked once to select whether to analyze sound from an external source using a microphone in the iCable, or to analyze the audio passing through the iCable. The automatic beat sensor system continues analyzing until it identifies a tempo. When a tempo is identified, two beeps from the iCable let the musician know that the BPM of the effects have been adjusted and the identified BPM displays in the BPM button 651. The BPM of the audio effect preset (all audio effect algorithms in the preset) can also be manually adjusted by clicking and holding a finger on the BPM button 651 to activate a slider which adjusts the BPM of the audio effects in that preset. BPM can also be globally adjusted by clicking and holding a finger on the global BPM button 652 to activate a global BPM slider or tap a tempo. In one embodiment, each audio effect has a BPM tempo lock (not shown) to prevent changes made with BPM button 651 or global BPM button 652. If the musician decides to go back to the original tempo (the tempo before any manual changes were made to the tempo) of an audio effect, she holds down the BPM button 651 or global BPM button 652 for several seconds.

Audio Effects Intensity/Volume Knob

As previously discussed, audio effect combinations are highly subjective. However, it could potentially save a guitarist much time experimenting on preferred combinations if there was a combination of algorithms and algorithm parameters that sound good to the musician across multiple guitar types (nylon string, electric, etc.). Due to the significant differences in sound between different guitars, it is often difficult that one set of algorithms and algorithm parameters can sound good across multiple types of guitars.

Although the order and composition of an audio effects chain (AEC) is subjective, through years of performing and recording, it has been found, as an example, that an audio effects chain (e.g., Preset 1 610) comprising: compression, overdrive (or distortion), an amplifier simulator, and delay generates a signal that can work with numerous types of guitars with only the intensity (volume) of the combined audio effects (in an audio effects chain) needing to be changed. The original audio effects chain mentioned above was designed to be used to create a rock-sounding guitar solo using a steel-string guitar. However, it happened that a nylon-string acoustic guitar was able to get the same rock sound during the guitar solo as the steel-string guitar by using a send knob (which allows a musician to vary the level of summed audio effects applied to a specific track of music) in Apple Logic Pro X. Since then, the same audio effects chain with varying summed master audio effects levels was also found to work on (i) numerous other types of guitar strings and/or guitar types, regardless of guitar body type (hollow or solid); and (ii) other types of guitars having different internal electronic amplification systems.

First, as shown in FIG. 6, the user either selects or creates an audio effects chain (e.g., Preset 1 610) containing one or more audio effects for a first guitar type (e.g., steel-string guitar) and adjusts the audio effects volume/intensity knob 660 (e.g., 20% of Preset 1) to work, for example, for a guitar solo sound using a distortion type audio effect sound. Next, the user applies the same audio effects chain to use for a second type of guitar (e.g., nylon-string guitar) and adjusts, as needed, the audio effects volume/intensity knob 660 (e.g., 75% of Preset 1) until a desired tone is achieved. It is the presence of the audio effects volume/intensity knob 660 on the app (and the ability to adjust its level) being within each preset that enables production of the desired audio effects level/intensity that in turn enable the audio effects preset chain to work on multiple guitar types. The preset volume/intensity knob 660 can be adjusted in the iCable app or, in other embodiments, in the iClip and iPedal.

iCable for Other Instruments

The iCable can be also be used with a microphone and other instruments, not just a guitar. For example, because almost all electronic keyboards use an instrument cable to produce their amplified sound, the iCable can also be used with an electronic (piano) keyboard to enhance the keyboard sound though audio effects such as reverb and delay. In addition, wind instruments from flute to trumpet to harmonica as well as other instruments, even drums when amplified electronically, can benefit from the portability and dynamic audio effects sonic expansion from the invention and use of the iCable.

Other iCable Applications

Using an iCable with a DAW

The iCable can record the guitar's audio directly from the iCable wirelessly into a DAW with or without the iCable's audio effects.

In one embodiment, audio is recorded directly from the iCable into Apple's Logic Pro as Audio. In this scenario, audio is passed to the iCable electronics, converted to digital, and the audio is sent wirelessly to an already "record enabled" audio track.

In a second embodiment, audio is recorded directly from the iCable, converted to MIDI in the iCable, then wirelessly sent to Apple's Logic Pro as MIDI. In this scenario, audio is passed to the iCable electronics, converted to digital, and the audio is first converted into MIDI data in the iCable then sent wirelessly to an already "record enabled" MIDI track.

In a third embodiment, audio is recorded directly from the iCable then wirelessly sent to Apple's Logic Pro where it is converted to MIDI. In this scenario, audio is passed to the iCable electronics, converted to digital, then sent wirelessly to Apple's Logic Pro where it is converted to MIDI and sent to an already "record enabled" MIDI track.

In a fourth embodiment, audio is recorded directly from the iCable into Apple's Logic Pro as both audio and MIDI. In this scenario, audio is passed to the iCable electronics, converted into MIDI data, then both the audio and the converted MIDI data are sent wirelessly to already "record enabled" audio and MIDI tracks.

iSampler

Background

A sampler is a hardware or software device that can store large numbers of audio clips, called samples, for different notes played on different instruments. A repertoire of samples stored in memory is called a sample bank or sample library. When a MIDI data stream is played via a sampler, these samples are pulled out of memory and played—a C on a piano, an F on a cello, or whatever is asked for in the MIDI messages. Because the sounds played via a sampler can be of actual recordings of musical instruments, they often sound realistic.

Figure 10:
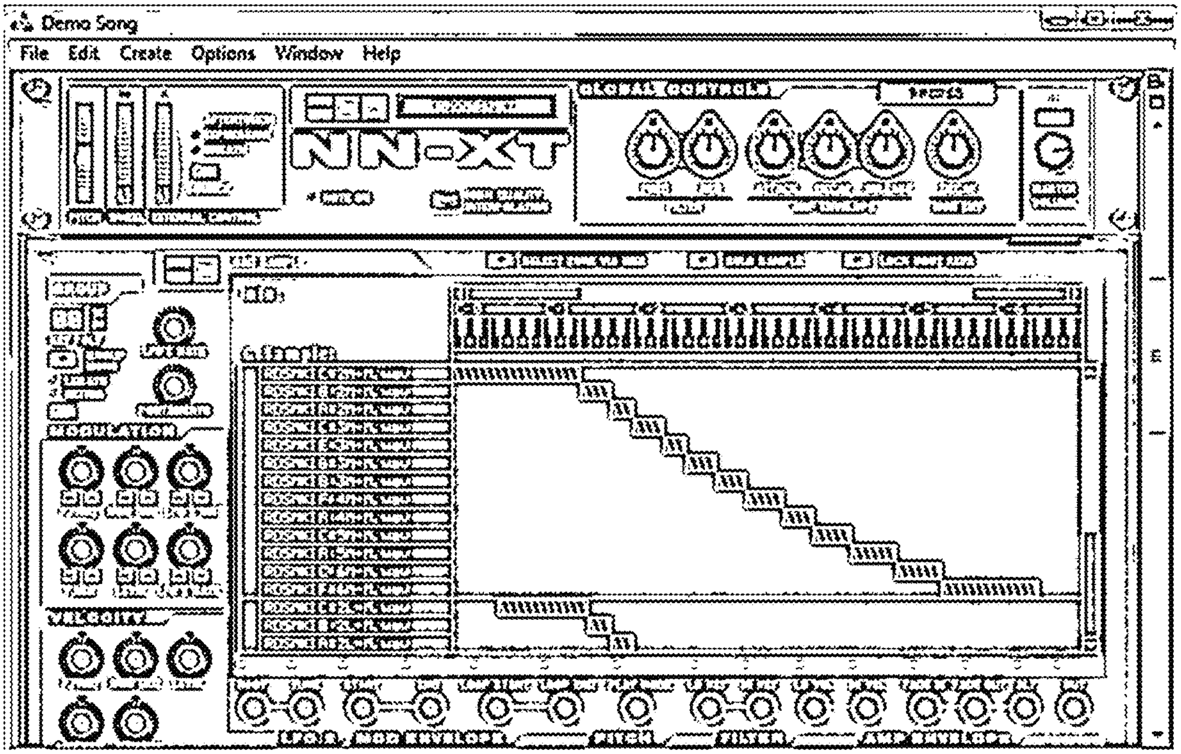
(PRIOR ART) FIG. 10
FIG. 10 shows the NN-XT from Reason, a prior art sampler.

An example of a sampler where you can create your own samples is the NN-XT sampler from Reason as shown in FIG. 10. There are WAV files for individual piano notes, but there does not need to be a WAV file for every single note on the keyboard. In a method called multisampling, one audio sample can be used to create the sound of a number of neighboring ones. The notes covered by a single audio sample constitute a zone. The sampler is able to use a single sample for multiple notes by pitch-shifting the sample up or down by an appropriate number of semitones. The pitch can't be stretched too far, however, without eventually distorting the timbre and amplitude envelope of the note such that the note no longer sounds like the instrument and frequency it's supposed to be. Very high and very low notes often can be stretched more without our minding it, since our ears are typically less sensitive in these areas.

There can be more than one audio sample associated with a single note. For example, a single note can be represented by three samples where notes are played at three different velocities (corresponding to how hard the key was struck when the note was played)—high, medium, and low. The same note played by different instruments has a different timbre and amplitude envelope depending on the velocity with which it is played, so having more than one sample for a note results in more accurate and realistic sounds.

Samplers can also be used for sounds that aren't necessarily recreations of traditional instruments, for example, someone can sample the sound of the freeway during rush hour and assign those sound files to the notes on the keyboard.

Sample libraries come in a variety of formats. Some contain raw audio WAV or AIFF files which have to be individually mapped to keys. Others are in special sampler file formats that are compressed and automatically installable on a keyboard or MIDI device that accepts such files.

Figure 11:
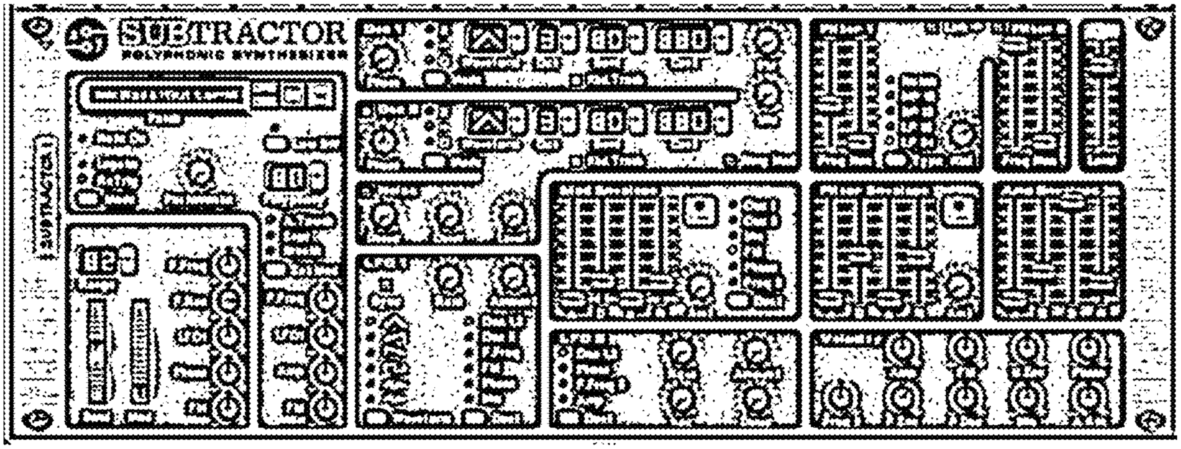
(PRIOR ART) FIG. 11
FIG. 11 shows the Subtractive Polyphonic Synthesizer from Reason, a prior art analog synthesizer.

Most professional synthesizers (that enable a user to manipulate sounds) typically do not have huge memory banks of quality samples. Instead, these synthesizers dynamically create sound by electronically manipulating basic waveforms like sawtooth, triangle, or square waves to alter their shapes. Under the hood, a synthesizer can be analog or digital. An analog synthesizer is a device that uses analog circuits to generate sound electronically. A digital synthesizer is a digital device that emulates analog synthesis. A synthesizer could use a variety of mathematical methods, including additive, subtractive, FM, AM, or wavetable synthesis, or physical modeling. These methods of creating sounds may not result in making the exact sounds of a musical instrument. Musical instruments are complex structures, and it's difficult to model their timbre and amplitude envelopes exactly. However, synthesizers can create entirely new sounds not encountered before in nature or music, offering creative possibilities to innovative composers. An example of an analog synthesizer with digital processing is the Subtractive Polyphonic Synthesizer from Reason as shown in FIG. 11.

Sound synthesis may blend samplers and synthesizers. Many samplers allow the musician to manipulate the samples with methods and parameter settings similar to those in a synthesizer. Although the user may start from nothing, a synthesizer generally has basic patches (settings) that serve as a starting point, prescribing, for example, the initial waveform and how it should be shaped. That patch is loaded in, and the user can make changes from there.

Figure 12:
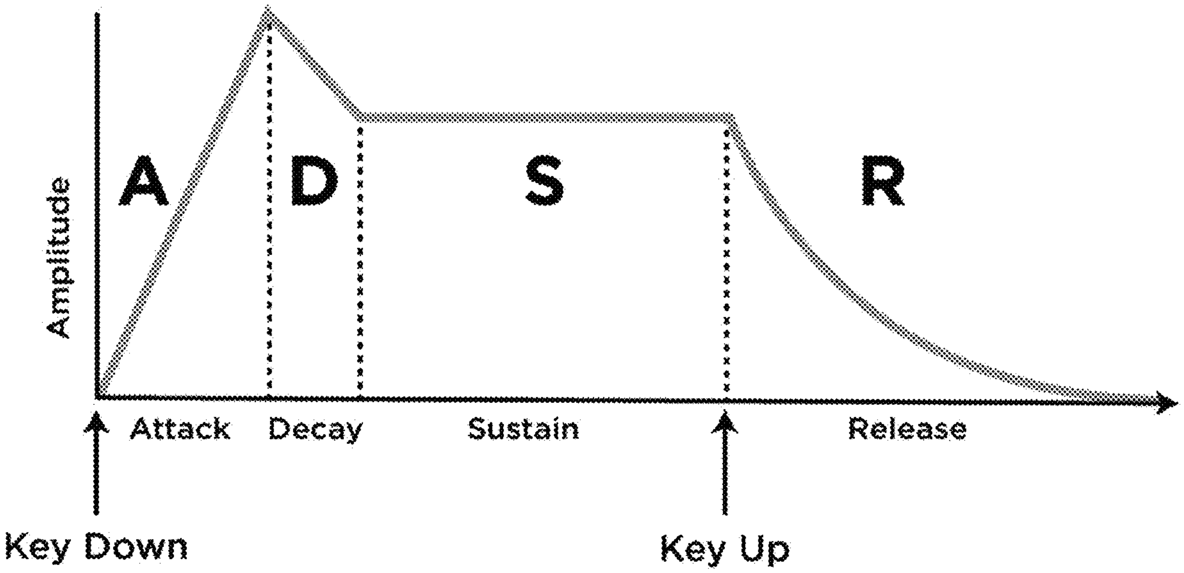
(PRIOR ART) FIG. 12
FIG. 12 shows a graph of the different stages of a sound.

Both samplers and synthesizers allow the user to manipulate the amplitude envelope (the ADSR settings, discussed below), apply modulation, use low frequency oscillators (LFOs) and waveforms, and adjust other parametric values. In sound and music, an envelope describes how a sound changes over time. It may relate to elements such as amplitude (volume), frequencies (with the use of filters) or pitch. For example, a piano key, when struck and held, creates a near-immediate initial sound which gradually decreases in volume to zero. Envelope generators, which allow users to control the different stages of a sound, are common features of synthesizers, samplers, and other electronic musical instruments. The most common form of an envelope generator is controlled with four parameters: attack, decay, sustain and release (ADSR) as shown in FIG. 12. When a key (on a keyboard) is first pressed, the Attack refers to the time it takes the sound to go from silent to the loudest level—for example, a volume range of 0-127. The Decay time controls how long it takes for the sound to go from the initial attack peak to the sustain level. Sustain is the level of output while a sustain instruction persists (held note). This stage can theoretically last indefinitely. Release controls how long it takes for the sound to return to silence after the key is released.

iSampler-iCable

The present invention enables the musician to store sample libraries (virtual instruments) in the iCable or use the iCable's DSP to synthesize sound. Instead of using a keyboard or other MIDI controller to play/trigger a sample, the digital audio signal of the musician's instrument is used as the controller. For example, a guitar could sound like a flute when the guitar's sound is analyzed and processed through the iSampler-iCable. The guitar sound is first analyzed for audio characteristics such as pitch and ADSR. Then, either (i) a sample can be triggered (and optionally manipulated) from the stored sample library to play a flute sound; or (ii) the DSP can use the digital audio signal waveforms to synthesize a flute sound.

Pitch can be detected by using a pitch detection algorithm in the iSampler-iCable to estimate the pitch or fundamental frequency of a musical note or tone in the audio signal. This can be done in the time domain, the frequency domain, or both as set forth in "Pitch Extraction and Fundamental Frequency: History and Current Techniques," by David Gerhard from the University of Regina in Regina, Saskatchewan.

The iSampler-iCable may need a larger digital storage capacity than a standard iCable to hold all of the samples and/or virtual musical instrument sample libraries as they may be tens of gigabytes in size.

To use the iSampler-iCable, the musician optionally selects the input/source instrument to the iSampler-iCable via the smartphone/tablet's app. The identification of an input/source instrument can be as basic as an off the shelf Fender Stratocaster Guitar or as complex as a Fender Custom Shop Stratocaster Guitar with a Seymore Duncan Hot Rodded Humbucker Pickup with a bridge pickup tone control. This could help the pitch detection algorithm be able to more accurately interpret the incoming audio signal.

Each instrument sample library has its own unique stylistic/performance attributes. With a guitar as the source instrument and the virtual instrument sample library chosen is a violin, the guitar player may play a note with a pick to make sure that the iSampler-iCable selects a sample played in a pizzicato fashion. In that aspect, the performance itself might use features that would replace the commonly used pitch bend or modulation wheel assigned to perform certain actions from a keyboard synthesizer such as the Native Instruments Komplete Kontrol S88 Smart Keyboard Controller.

In the preferred embodiment, the iSampler-iCable comprises a virtual assistant with integrated automated speech recognition (ASR) and natural language understanding (NLU) software (such as Apple's SIRI™, Amazon's Alexa™, or Google Assistant™). In this embodiment, a microphone is incorporated into the iSampler-iCable to receive voice input. The DSP would include the ASR algorithms to turn the speech into text and NLU algorithms to turn the text into understandable commands for the DSP. The musician can then verbally provide identification of the input/source instrument and output virtual instrument or sample library to the iSampler-iCable. For example, "Siri, new iSampler, the input/source instrument is a Fender Stratocaster, and the output instrument/sound is a concert flute." The virtual instrument or sample desired can be almost any type of musical instrument or sound—a concert flute, a classical violin, a drum set, a specific virtual choir sample pack, or even city traffic sounds.

After the input/source instrument and output instrument/sound or sample library is chosen, the iSampler-iCable app wirelessly (or with a cable if it is a large sample library) sends the selected sample or sample library to the iSampler-iCable. After the sample or sample library is uploaded into the iSampler-iCable, the musician starts playing the guitar. The DSP will first analyze the pitch then analyze ADSR components of the sound. The iSampler-iCable is then able to select and process the appropriate sample from the selected sample library to match the pitch of the guitar while the output of the iSampler-iCable (heard through an amplification system) plays the virtual instrument selected.

In one embodiment, the iCable-iSampler can use multi-sampling. The audio signal from the input instrument (a guitar or other instrument that uses a cable to help amplify its sound) is used to trigger/play audio from one or more virtual instruments. The input audio is converted to a digital signal or a digital MIDI signal which triggers the sample sound desired (e.g., a violin sound) based upon a limited number of audio samples so—each audio sample may be pitch-adjusted for a zone of notes. The original or adjusted audio sample is then converted back to an analog audio signal which is then output to an amp.

The iSampler-iCable can also be used for imitative synthesis. The audio signal from a guitar (or other instrument that uses a cable to amplify its sound such as a an electronic keyboard) is used to trigger/play a synthesized sound (sample) stored in the iSampler-iCable, wirelessly sent from the iSampler-iCable app. Input audio is converted to a digital signal or digital MIDI signal which triggers the desired sound/patch (e.g., a violin) where it can then be manipulated with knobs/switches/sliders in the iCable app corresponding to multiple oscillators, sine waves, filters, or other sound synthesis tools and then converted back to an analog audio signal which is then outputted to an amp.

Any user-created patches/sounds created by musicians using the iSampler-iCable or the iSampler-iCable app can be either shared or sold from a patch/sound database or web site.

Using Artificial Intelligence in the iSampler-iCable: Sampling

In another embodiment, once an instrument is isolated, a virtual instrument library can be created for that instrument. For example, after isolating Elton John's piano on his song "Rocket Man," a virtual instrument library can be created using multisampling from the notes sampled in the song. Software that can be used to isolate instruments from within songs, include Magenta Studio by Yotam Mann, Spleeter by Deezer, and Lalal.ai.

Using Artificial Intelligence in the iSampler-iCable: MDAF & MDAF-PS

A further extension of this embodiment enables the musician to develop a Musical Digital Audio Fingerprint (MDAF) to be associated with a specific musician's "sound" used on a specific song, based on the type of guitar (or other musical instrument) and audio effects used for a particular song, as well as potentially a MDAF-PS, which is the associated performance style of the actual performance of a specific song by a musician.

The MDAF of a musician can include but not be limited to the type of guitar (or other musical instrument) used, audio effects used such as reverb, chorus and distortion (the audio effects chain), the amplifier the musician used during a particular recording and the type and size of strings used.

The performance characteristics of a musician's MDAF-PS can include, but are not limited to, analysis of strumming patterns (both with and without a pick) including the direction of picking or strumming, analysis of the vibrato used on the strings, where the musician accents a particular part of a beat in a measure, amount of rubato a musician uses (how carefully a musician adheres to the tempo of a song), the tempo of the song as well as other distinctive performance characteristics such as tapping, made famous by Eddie Van Halen.

In one embodiment, stored MDAF data can be used to generate one or more algorithms to control audio effects and instrument emulation. The resulting algorithms would be used to adjust the sound of a user's guitar. For example, an acoustic guitar with no audio effects can be transformed into the sound of a heavy metal-sounding electric guitar.

Using Eric Clapton's recording of his song "Layla" recorded live at the MTV Unplugged concert at Bray Film Studios in 1992, an example of the MDAF and the MDAF-PS is as follows:

MDAF: Guitar: Martin 000-42; Audio effects: Spring Reverb; Amplifier: Fender Twin; Strings used: Steel.

MDAF-PS: Style of song: Folk/Folk Rock; Style of Performance: Finger style; Tempo/Feel: 94BPM-slight swing feel.

In another embodiment, AI can be used to suggest/offer other stylistically-similar MDAF algorithms. In order to help train the AI, the iSampler-iCable can require that the player play a predetermined chord progression (training pattern) in certain styles of music at specific tempos (e.g., a pop I-vi-IV-V chord pattern or a simple 1-IV-V blues pattern) while applying their favorite audio effects chain. This information would be cataloged in the MDAF database to be later accessed via the iSampler-iCable app. Ultimately, the iSampler could automatically suggest alternative MDAF algorithms to: (i) algorithms previously stored in the iCable; or (ii) MDAF algorithms by other players to be downloaded then used in the iSampler-iCable. In summary, by using the same required chord progression, music style, tempo, and associated AECs, as well as manually adding other meta data of a player's MDAF (e.g., musical influences on training pattern), more variables could be controlled to assist the AI in suggesting/offering alternative stylistically-similar MDAFs from one musician to another.

Because a recorded musician's MDAF inherently contains information to identify one or more audio effects chains (AECs) used, this gives the iSampler-iCable user the ability to choose from a number of different AECs. For example, a musician using the iSampler-iCable might only want to use the AEC used by Keith Richards on the Rolling Stones' song "Jumping Jack Flash," separate from the sound/modeling of the guitar Keith Richards used on the song. The MDAF's AEC for Keith Richards' guitar part on "Jumping Jack Flash" will contain information needed to recreate the audio effects identified on that specific guitar track. The iSampler-iCable app can download an AEC algorithm that emulates the AEC used by Keith Richards on his guitar on the song "Jumping Jack Flash," (e.g., a combined short spring reverb with a short pre-delay, chorus using a lot of "depth" with a slow rate, and overdrive whose tone, level and drive are all at the 50% position).

In one embodiment, the virtual assistant can be directed to select different audio effects chains including the reordering of another player's MDAF. For example, a musician using the iSampler-iCable can say, "iSampler, re-order the AEC on Preset 1, and put the reverb first in the audio effects chain."

The musician can always adjust the parametric values of each individual audio effect while playing. In one embodiment, the musician can play/record for a few seconds and while playing back the recorded guitar audio, adjust individual parametric values of each separate audio effect of the recorded audio. For example, the musician can say, "iSampler, add a little more reverb." In this way, the musician can become her own sound/mix engineer adjusting the actual sound effects of her guitar while the guitar part is playing for a type of "hands free" audio effect adjustment to an instrument.

A database of MDAFs can also hold the MDAFs of musicians' instruments at various points in their careers. For example, there can be a MDAF of Elton John's piano from 1970-1978 and another from 1982-1992 where each MDAF is extrapolated from the recorded piano sound of the records released during those periods of time.

A musician could request an MDAF algorithm of a popular style of music, for example an algorithm based on electric guitar tracks where the underlying song has at least 10 million audio streams from the genre of pop music.

Using a Virtual Assistant to Request an AEC

By combining the features of the iCable and iSampler, the musician can plug in an acoustic guitar, identify the guitar and style of playing, and say out loud to a voice recognition module or virtual assistant in the iSampler-iCable (as picked up by a microphone in the iCable), "iSampler, I have a Gibson Acoustic Guitar, I am playing blues music, I want a new AEC of reverb, chorus, and a little delay in the style of Stevie Ray Vaughan." The iSampler-iCable then loads the requested AEC. If the musician does not like the loaded AEC, the musician can say, "iSampler, skip" and the iSampler-iCable will load a new AEC option. When the musician is satisfied with a particular AEC, the musician can say, "iSampler, save as Preset 1." The musician can also say, "iSampler, remove the reverb from the AEC" to further customize her AEC. The musician can also say, "iSampler, I want a new AEC of chorus, distortion, and a little delay" and, when satisfied, save that as a preset. As previously described with the iCable, multiple presets can be saved in the iSampler-iCable. In one embodiment, guitar/input instrument identification can be done automatically. The AI could be trained to recognize an instrument by its audio characteristics, known as instrument modeling. For example, the AI could be trained to understand the difference between a Godin Multiac Grand Concert nylon string guitar and a Fender Stratocaster with steel strings. AI-determined identification or modeling of the instrument may need to be performed in a non-live performance setting as the processing may not be able to occur in real-time. For example, a musician may need to slowly pluck one string at a time as opposed to playing a song (fast) in real-time. One example of AI software than can identify musical instruments is MIT's PixelPlayer.

In another embodiment, a user can say to the virtual assistant in the iSampler-iCable: "iSampler, give me the sound of Eddie Van Halen's guitar on his song 'Eruption.'" The MDAF online dataset, from which MDAF algorithms can be derived, would include a list of songs, bands, musicians, instruments, performance/audio characteristics for each separate instrument or vocal track, along with production notes the audio engineers or musicians took while recording the songs, including type of amplifier used as well as microphone and microphone placement (close or far away from an amplifier or instrument). The iSampler-iCable would then know that Eddie Van Halen played the electric guitar on "Eruption," the type of guitar he used, the electronics of his guitar (e.g., the type of pickups used and their combinations), the gauge of his guitar strings, the amplifier he used, and the audio effects used on that particular track. The user can then say, "Increase the reverb amount," or "Add a little distortion" to fine tune the user's guitar's audio effects from Eddie Van Halen's MDAF "Eruption" algorithm.

Using Neural Audio Synthesis (NAS) to Generate an AEC Algorithm

As mentioned above, AI can be used to recommend (and then generate an algorithm for) an AEC of a specified musician on a particular song based on the analysis of a song. The overall process for using Neural Audio Synthesis (NAS) to create an AEC algorithm using artificial intelligence is to: (i) identify the song to be analyzed; (ii) isolate the instrument desired from the mixed song; (iii) isolate the audio effects from the isolated instrument; and (iv) recreate the isolated audio effects into a new audio effects algorithm.

The iSampler-iCable may also compare data sets from the web (via the iCable app) with data learned within the iCable regarding the user's preferred "sound," or MDAF, which can be made up of several things, namely, the type of instrument used as well as the audio effects used on the instrument, or, potentially, the audio effects used when a musician plays a particular style of music. By the identification of a user's favored combination and ordering of audio effect algorithms used with a specific type of guitar or instrument used, the iSampler-iCable can then offer a new stylistically-similar MDAF algorithm into which the user's sound can be transformed.

To create the AEC algorithm using artificial intelligence, after identifying the song, the iSampler isolates the instrument in the song using software such as MIT's PixelPlayer, Magenta Studio by Yotam Mann, Spleeter by Deezer, or Lalal.ai. Then audio effects are isolated using software such as DeRoom Pro by Accentize, and Unveil by Zynaptic. Then an algorithm is created based on the isolated audio effects using software such as Chameleon Reverb Matching AI by Accentize and The Synthesis ToolKit in C++. Finally, a new AEC algorithm can be generated from the isolated audio effects by either combining the identified audio effects into a single algorithm, or by creating multiple individual audio effect-generated algorithms.

After the MDAF is selected and the AEC algorithm(s) are generated, the individual components of the MDAF's AEC (reverb+chorus+delay) may be manipulated. For example, the user can say, "iSampler, take out the delay," or, "iSampler, increase the distortion level." The iSampler-iCable DSP can take the MDAF's AEC and isolate and separate the delay so that only the reverb+chorus remain. This could either be accomplished within the iSampler-iCable software, or within the iCable app then sent over to the iSampler-iCable itself for use in a performance or recording. Additionally, as mentioned above, a user's created/adjusted AEC can then be saved within the iCable app to be sent to her DAW of choice such as Apple's Logic Pro to be used in further recordings.

In another embodiment, the user can say to the iSampler-iCable's virtual assistant, "iSampler, make my guitar sound like most guitars used in the current top 10 hits in North America." The iSampler-iCable can then suggest an AI-generated MDAF algorithm(s) for both audio effects and instrument modeling.

In one embodiment, the iSampler-iCable can suggest a similar type of audio effect algorithm based on a specified type of audio effect algorithm used on an instrument within a specific song. The user can utilize the voice recognition of the iSampler-iCable to say, "iSampler, find the same type of reverb that Jimi Hendrix used on his song 'Purple Haze." The iSampler-iCable will use the online data sets to locate Jimi Hendrix' s version of "Purple Haze," isolate the electric guitar track, isolate the audio effects from the electric guitar track, isolate the reverb from the isolated audio effects, analyze the reverb, and create or select a reverb algorithm.

OTHER EMBODIMENTS

In another embodiment, the iSampler-iCable can suggest an AEC based on analysis of previously used AECs the musician using the iCable often relies upon for different styles of music playing. The user can utilize the virtual assistant of the iSampler-iCable to say, "iSampler, find me a new AEC based upon the tempo of the song I'm playing used in Country music" or "iSampler, find me a new reverb with a lot of distortion." This could also be based upon how a musician would label (meta tag) Presets used in her AECs stored in the iCable/iCable app.

The AI in the iSampler-iCable app can also access a database of other iSampler-iCable users (a community of iSampler-iCable MDAFs) to suggest AECs based on previously used AECs by the user, or a combination of the above. For example, the iSampler-iCable could suggest 'a reverb used in the 60's or 70's,' 'a reverb used by heavy metal bands of the 80's,' or 'a reverb used by George Harrison while with the Beatles' because that is the user's style of music identified by the iSampler-iCable over time. Additionally, musicians can not only create new MDAFs, but can offer for sale their own AECs based on different genres of music for other musicians to download and use within the iCable.

Creating/Selecting Virtual Instruments Using Artificial Intelligence

Artificial Intelligence (AI) can also be used to create playable synthetic instruments using Neural Audio Synthesis (NAS) within the iSampler-iCable. Traditional synthesizers generate audio from physical electronic components like oscillators and wavetables (or software representing the physical electronic components). Control signals are used to set pitch, velocity, and filter parameters and shape the tone, timbre and dynamics of a sound. NAS uses deep neural networks—a data driven approach to audio synthesis. Rather than specifying a specific arrangement of oscillators or algorithms for sample playback (such as in FM Synthesis or Granular Synthesis, instrument sounds are generated with a neural network model. Learning directly from data (such as with NSynth's approximately 1,000 4-second harmonic musical instrument samples), NAS (such as Deep Mind's WaveNet) models raw audio at, for example, 16,000 samples per second with a completely audio regressive model, in which the prediction for every one of those samples is influenced by all previous ones. After training (building an autoregressive model for each of the 1,000 samples of raw audio), the network can be sampled to generate synthetic instruments. At each step during sampling, a value is drawn from the probability distribution computed by the network. This value is then fed back into the input and a new prediction for the next step is made.

NAS provides artists with intuitive control over timbre and dynamics and the ability to explore new sounds that would be difficult or impossible to produce with a hand-tuned synthesizer. An example of a NAS system is Google AI's Magenta which uses Differential Digital Signal Processing (DDSP) to incorporate deep learning into a digital signal processor. With DDSP, a neural network is used to convert a user's input into complex DSP controls that can produce more realistic signals. This input could be any form of control signal, including features extracted from audio itself. Since the DDSP units are differentiable, the neural network can be trained to adapt to a dataset through standard backpropagation.

In one embodiment of the present invention, audio from an instrument such as a guitar is passed into the iCable electronics, converted to a digital audio or MIDI signal, processed through the DSP which applies the NAS-created patch, converted back to analog, and output to an amp or wirelessly sent to a recording device such as a DAW (Digital Audio Workstation such as Apple's Logic Pro).

Creating MIDI Sample Patches Using AI (NAS) from Audio

The iSampler/iCable DSP analyzes performance characteristics of each note of the input instrument such as: attack, decay, sustain, release, vibrato, bowing (of a stringed instrument), breath (of wind instrument), use of accessories such as a trumpet mute, articulation such as plucking, string type, reed type, pick type, picking style, what type of string and string gage, type of microphone, distance of microphone from a sound source, as well as other types of instrument-specific performance techniques.

Using NAS (Neural Audio Synthesis), the iSampler-iCable DSP can use the MDAF algorithm as described above of Eddie Van Halen's guitar sound used on "Eruption" to create a MIDI sample patch which is composed of a MIDI playable virtual instrument and an AEC algorithm. The musician can then use her instrument to trigger/play the MIDI sample patch. In another example, the iSampler-iCable app can analyze the top EDM (or other genre of music) songs and generate similar sounding MIDI sample patches based on the instruments used in those songs. Once a MIDI sample patch is created, that patch can then be saved then used within the musician's DAW, such as Apple's Logic Pro, to be triggered/played by other instruments such as a MIDI keyboard.

We claim:

1. A system comprising:

an analog audio cable, the analog audio cable comprising a first plug configured for connection to an instrument or a microphone, a middle cable portion, and a second plug configured for connection to an output device, wherein any one or more of the first plug, the middle cable portion, and the second plug comprises:

an analog-to-digital converter configured to convert an input audio signal to a digital signal, the input audio signal produced by the instrument or the microphone;

a microcontroller configured to receive one or more audio samples from an app on a computing device and store the one or more audio samples in a memory, a synthesizer;

a digital signal processor in operable communication with the microcontroller, the digital signal processor further configured to receive the digital signal and determine one or more audio characteristics of the digital signal, the digital signal processor further configured to perform one or more of:

generate an audio output signal based at least on: an audio sample of the one or more audio samples, and at least one of the one or more audio characteristics of the digital signal, and generate an audio output signal based on: at least one of the one or more audio characteristics of the digital signal, and an input from the synthesizer;

a digital-to-analog converter configured to convert the audio output signal to an analog output signal.

2. The system of claim 1 wherein the analog audio cable further comprises a wireless receiver configured to receive the one or more audio samples from a wireless device.

3. The system of claim 1, further comprising an external controller configured to select the one or more audio samples.

4. The system of claim 1, wherein the analog audio cable further comprises a wireless receiver configured to receive one or more MDAF algorithms, wherein the audio output signal is further based on at least one of the one or more MDAF algorithms.

5. The system of claim 1, wherein the analog audio cable further comprises a wireless receiver, the wireless receiver configured to receive one or more parameters, the one or more parameters configured to modify at least one of the one or more audio samples.

6. The system of claim 1, wherein the analog audio cable can output the input audio signal.

7. The system of claim 1, wherein the one or more audio characteristics of the digital signal include one or more or attack, decay, amplitude, and frequency/pitch.

8. A method to process audio within an analog audio cable that includes a first plug configured for connection to an instrument or a microphone, a middle cable portion, and a second plug configured for connection to an output device, the method comprising:

converting, using an analog-digital converter, within any one or more of the first plug, the middle cable portion, and/or the second plug of the analog audio cable, the audio signal to a digital signal, the audio signal produced by an instrument or a microphone;

receiving, using a microcontroller, one or more audio samples from an app on a computing device and storing the one or more audio samples in a memory;

determining, using a digital signal processor in operable communication with the microcontroller and the memory and configured to receive the digital signal, one or more audio characteristics of the digital signal and one or more of:

generating an audio output signal based at least on: an audio sample of the one or more audio samples, and at least one of the one or more audio characteristics of the digital signal; and generating an audio output signal based on: at least one of the one or more audio characteristics of the digital signal, and an input from a synthesizer, wherein the synthesizer is located within any one or more of the first plug, the middle cable portion, and/or the second plug; and converting, using a digital-analog converter within any one or more of the first plug, the middle cable portion, and/or the second plug, the audio output signal to an analog signal.

9. The method of claim 8, further comprising receiving, using a wireless receiver, the one or more audio samples from a wireless device.

10. The method of claim 8, further comprising receiving, using a wireless receiver, a selection of the one or more audio samples from an external controller.

11. The method of claim 8, further comprising receiving, using a wireless receiver, one or more MDAF algorithms, wherein the audio output signal is further based on at least one of the one or more MDAF algorithms.

12. The method of claim 8, further comprising receiving, using a wireless receiver, one or more parameters, the one or more parameters for adjusting at least one of the one or more audio samples.

13. The method of claim 8, wherein the one or more audio characteristics of the digital signal include one or more or attack, decay, amplitude, and frequency/pitch.

14. An analog audio cable comprising:

a first plug configured for connection to an instrument or a microphone, a middle cable portion, and a second plug configured for connection to an output device, wherein any one or more of the first plug, the middle cable portion, and/or the second plug comprises:

an analog-to-digital converter configured to convert an audio signal to a digital signal, the audio signal produced by an instrument or microphone;

a microcontroller configured to receive one or more audio samples from an app on a computing device and store the one or more audio samples in a memory;

a synthesizer;

a digital signal processor in operable communication with the microcontroller and configured to receive the digital signal and determine one or more audio characteristics of the digital signal, the digital signal processor further configured to perform one or more of:

generate an audio output signal based at least on: an audio sample of the one or more audio samples, and at least one of the one or more audio characteristics of the digital signal; and generate an audio output signal based on: at least one of the one or more audio characteristics of the digital signal, and an input from the synthesizer; and a digital-analog converter configured to convert the audio output signal to an analog signal.

15. The analog audio cable of claim 14, wherein the analog audio cable further comprises a wireless receiver configured to receive the one or more audio samples from a wireless device.

16. The analog audio cable of claim 14, further comprising an external controller configured to select the one or more audio samples.

17. The analog audio cable of claim 14, wherein the analog audio cable further comprises a wireless receiver configured to receive one or more MDAF algorithms, wherein the audio output signal is further based on at least one of the one or more MDAF algorithms.

18. The analog audio cable of claim 14, further comprising a wireless receiver, the wireless receiver configured to receive one or more parameters, the one or more parameters configured to modify at least one of the one or more audio samples.

19. The analog audio cable of claim 18, wherein the analog audio cable can output the input audio signal.

20. The analog audio cable of claim 14, wherein the one or more audio characteristics of the digital signal include one or more or attack, decay, amplitude, and frequency/pitch.

* * * * *